United States Patent [19]

Haruki et al.

[11] Patent Number: 4,969,045

[45] Date of Patent: Nov. 6, 1990

[54] IMAGE SENSING APPARATUS HAVING AUTOMATIC IRIS FUNCTION OF AUTOMATICALLY ADJUSTING EXPOSURE IN RESPONSE TO VIDEO SIGNAL

[75] Inventors: Toshinobu Haruki, Shijonawate; Kenichi Kikuchi, Osaka; Masao Takuma, Toyonaka, all of Japan

[73] Assignee: Sanyo Electric Co., Ltd., Japan

[21] Appl. No.: 354,303

[22] Filed: May 19, 1989

[30] Foreign Application Priority Data

| May 20, 1988 | [JP] | Japan | 63-124533 |
| May 20, 1988 | [JP] | Japan | 63-124534 |
| Jun. 17, 1988 | [JP] | Japan | 63-150574 |
| Jun. 17, 1988 | [JP] | Japan | 63-150575 |
| Aug. 2, 1988 | [JP] | Japan | 63-193027 |

[51] Int. Cl.$^5$ .................................................... H04N 5/235
[52] U.S. Cl. ................................ 358/228; 358/213.19; 358/164
[58] Field of Search ............ 358/228, 213.19, 213.13, 358/909, 164

[56] References Cited

U.S. PATENT DOCUMENTS

| 4,489,350 | 12/1984 | Kimura | 358/213.19 |
| 4,535,364 | 8/1985 | Hirobe | 358/228 |
| 4,547,808 | 10/1985 | Arai et al. | 358/228 |
| 4,638,367 | 1/1987 | Sakane et al. | 358/228 |
| 4,717,960 | 1/1988 | Shikano et al. | 358/228 |

FOREIGN PATENT DOCUMENTS 110369  5/1987  Japan .

Primary Examiner—Stephen Brinich
Attorney, Agent, or Firm—Peter L. Michaelson

[57] ABSTRACT

In a video camera having an automatic iris function and a gamma correcting function, an object evaluating value is calculated based on an exposure evaluating value in a sampling area designated as a priority area, a target luminance level for exposure control is changed according to the relation between this object evaluating value and exposure evaluating values in sampling areas other than the sampling area selected as the priority area, a ratio with which the priority area is weighted in calculating the object evaluating value is changed, and a correction value for gamma correction is further changed. As a result, overexposure and underexposure in a picture are decreased. Furthermore, if an extremely small value is included in exposure evaluating values in sampling areas, the value is previously replaced with a predetermined fixed value, so that the effect of noises or the like on exposure adjustment is decreased.

28 Claims, 15 Drawing Sheets

IMAGE SENSING APPARATUS HAVING AUTOMATIC IRIS FUNCTION OF AUTOMATICALLY ADJUSTING EXPOSURE IN RESPONSE TO VIDEO SIGNAL

BACKGROUND OF THE INVENTION

1. Field of the Invention

The present invention relates generally to an image sensing apparatus, and more particularly, to an image sensing apparatus such as a video camera having an automatic iris function of automatically adjusting exposure in response to a video signal obtained from an image sensor.

2. Description of the Background Art

Conventionally, in an image sensing apparatus such as a video camera, it is important to obtain brightness suitable for an object, i.e., a suitable level of a luminance signal obtained from an image sensor. Such a level of a luminance signal includes the average brightness in a picture, i.e., an absolute level of the luminance signal obtained from the image sensor and the contrast of the picture, i.e., a relative level thereof. The former is adjusted by an exposure adjusting operation such as adjustment of an optical iris of a lens and control of the amplification gain of a video signal, while the latter is adjusted by a gamma ($\gamma$) correction mechanism.

More specifically, an image sensing apparatus such as a video camera having a function of automatically adjusting exposure in response to a video signal obtained from an image sensor, i.e, a so-called automatic iris function has been put into practice. Such a conventional automatic iris system mainly includes two types: a system of mechanically adjusting exposure by adjusting an optical iris of a lens and a system of electrically adjusting exposure by adjusting the amplification factor of an amplifier for amplifying a level of a video signal obtained from an image sensor.

However, such a conventional automatic iris system has the following disadvantages: when a high luminance portion such as a light source is included in a picture, for example, the amount of stopping down of the lens is increased so that the gain of the entire picture is decreased, whereby a major object becomes insufficiently bright. Contrary to this, when the background is very dark, the amount of stopping down of the lens is decreased so that the gain of the entire picture is increased, whereby the major object becomes too bright.

An exposure correcting method for eliminating such disadvantages has been proposed in Japanese Patent Laying-Open No. 110369/1987. In this exposure correcting method, in view of the fact that a major object is arranged in the center of a picture in many cases, the picture is divided into a central region and a peripheral region, a signal level of a video signal in each of the regions is detected as an evaluating value, and the evaluating value in the central region is weighted with respect to the evaluating value in the peripheral region (in the extreme case, the central region "1" while the peripheral region "0"). The size of the aperture of the diaphragm and the amplification gain of the video signal are optically controlled according to the ratio of both the evaluating values, so that contribution of the central region of the picture to the determination of exposure is increased.

On the other hand, the above described gamma correction will be described in detail. In general, a dynamic range of the present image sensor (approximately 40 dB) is much smaller than a dynamic range of the luminance of an object (approximately 100 dB), and a dynamic range of a display device such as a CRT (Cathode Ray Tube) (approximately 30 to 40 dB) is the same as or smaller than that of the image sensor. Thus, even if the brightness of a picture, i.e, an absolute level of a luminance signal is controlled, a high luminance portion in the picture is saturated and a low luminance portion therein is blackened all over, so that it is difficult to obtain the brightness suitable for the entire picture.

In an ordinary image sensing apparatus, gamma correction of a luminance signal is made in a circuit on the side of a camera such that overall gamma characteristics of an entire system, including all devices from an image sensor to a display device, based on photoelectric conversion characteristics (gamma characteristics) of the image sensor and nonlinear photoelectric conversion characteristics of the display device is always 1.

However, considering a case in which the central region of the picture is taken as a priority area to carry out exposure adjustment, to always obtain exposure most suitable for a major object in the central region of the picture, as described above, if there is a substantial difference in luminance between the central region and the peripheral region of the picture, the following problems occur. More specifically, considering a case in which the central region is relatively substantially brighter than the peripheral region, if this central region is controlled to the most suitable luminance level, substantial underexposure occurs in a non-priority portion of the peripheral region. Contrary to this, considering a case in which the central region is relatively substantially darker than the peripheral region, if this central region is controlled to the most suitable luminance level, substantial overexposure occurs in the non-priority portion of the peripheral region.

Additionally, if and when the luminance level in the priority area is extremely small, the S/N (signal-to-noise) ratio is degraded, so that the luminance level frequently fluctuates due to the effect of noises, whereby exposure control becomes unstable.

SUMMARY OF THE INVENTION

Accordingly, an object of the present invention is to provide an image sensing apparatus capable of decreasing overexposure and underexposure in a picture.

Another object of the present invention is to provide an image sensing apparatus capable of performing stable exposure control without being affected by noises or the like even if a luminance level is small.

Still another object of the present invention is to provide an image sensing apparatus capable of performing gamma correction for further correcting automatic exposure control to prevent overexposure in a high luminance portion and underexposure in a low luminance portion.

Briefly stated, the present invention is directed to a image sensing apparatus for automatically adjusting exposure to an object, the image sensing apparatus comprises an image sensing circuit having a lens and an image sensor for generating a video signal in response to light incident from the object; an apparatus for changing exposure to the object; a circuit for setting a plurality of sampling areas divided on an image sensed picture in a time-divisional manner of the video signal; an exposure evaluating value detecting circuit for detecting a level of a luminance signal in a video signal in each of the plurality of sampling areas to supply the same as an exposure evaluating value in the corresponding sampling area; an object evaluating value calculating circuit for selecting at least one of the plurality of sampling areas as a priority area for exposure control and calculating an object evaluating value representing exposure of the entire image sensed picture based on an exposure evaluating value in the selected sampling area; an exposure control circuit for controlling the exposure changing apparatus such that the object evaluating value approaches a predetermined target luminance level; and a circuit for changing the target luminance level according to the relation between the object evaluating value and exposure evaluating values in the sampling areas other than the sampling area selected as the priority area.

In accordance with another aspect of the present invention, an image sensing apparatus for automatically adjusting exposure to an object comprises an image sensing circuit having a lens and an image sensor for generating a video signal in response to light incident from the object; an apparatus for changing exposure to the object; a circuit for setting a plurality of sampling areas divided on an image sensed picture in a time-divisional manner of the video signal; an exposure evaluating value detecting circuit for detecting a level of a luminance signal in a video signal in each of the plurality of sampling areas to supply the same as an exposure evaluating value in the corresponding sampling area; an object evaluating value calculating circuit for selecting at least one of the plurality of sampling areas as a priority area for exposure control, weighting with a predetermined ratio an exposure evaluating value in the selected sampling area with respect to exposure evaluating values in sampling areas other than the sampling area selected as the priority area and calculating an object evaluating value representing exposure of the entire image sensed picture based on the exposure evaluating values; an exposure control circuit for controlling the exposure changing circuit such that the object evaluating value approaches a predetermined target luminance level; and a circuit for changing the ratio according to the relation between the object evaluating value and the exposure evaluating values in the other sampling areas.

In accordance with still another aspect of the present invention, an image sensing apparatus for automatically adjusting exposure to an object comprises an image sensing circuit having a lens and an image sensor for generating a video signal in response to light incident from the object; an apparatus for changing exposure to the object; a circuit for setting a plurality of sampling areas divided on an image sensed picture in a time-divisional manner of the video signal; an exposure evaluating value detecting circuit for detecting a level of a luminance signal in a video signal in each of the plurality of sampling areas to supply the same as an exposure evaluating value in the corresponding sampling area; a circuit for comparing the exposure evaluating value supplied from the exposure evaluating value detecting circuit with a predetermined reference value to replace the exposure evaluating value with a predetermined fixed value when the exposure evaluating value is smaller than the reference value; an object evaluating value calculating circuit for selecting at least one of the plurality of sampling areas as a priority area for exposure control and calculating an object evaluating value representing exposure of the entire image sensed picture based on an exposure evaluating value in the selected sampling area; and an exposure control circuit for controlling the exposure changing apparatus such that the object evaluating value approaches a predetermined target luminance level.

In accordance with a further aspect of the present invention, an image sensing apparatus for automatically adjusting exposure to an object and automatically performing gamma correction of a video signal comprises an image sensing circuit having a lens and an image sensor for generating a video signal in response to light incident from the object; an apparatus for changing exposure to the object; a circuit for setting a plurality of sampling areas divided on an image sensed picture in a time-divisional manner of the video signal; an exposure evaluating value detecting circuit for detecting a level of a luminance signal in a video signal in each of the plurality of sampling areas to supply the same as an exposure evaluating value in the corresponding sampling area; an object evaluating value calculating circuit for selecting at least one of the plurality of sampling areas as a priority area for exposure control and calculating an object evaluating value representing exposure of the entire image sensed picture; an exposure control circuit for controlling the exposure changing apparatus such that the object evaluating value approaches a predetermined target luminance level; a circuit for calculating a value indicating the contrast of the image sensed picture based on the exposure evaluating values supplied from the exposure evaluating value detecting circuit; a circuit for determining a gamma correction value based on the value indicating the contrast to perform gamma correction of the video signal according to this gamma correction value; and a circuit for changing the gamma correction value according to the relation between the object evaluating value and exposure evaluating values in sampling areas other than the sampling area selected as the priority area.

A principal advantage of the present invention is that a target luminance level for exposure adjustment is changed according to the relation between a luminance level in a priority area and a luminance level in a non-priority area, so that overexposure and underexposure in a picture can be decreased.

Another advantage of the present invention is that a ratio with which an exposure evaluating value in a priority area is weighted is changed according to the relation between a luminance level in the priority area and a luminance level in a non-priority area, so that overexposure and underexposure in a picture can be decreased.

Still another advantage of the present invention is that if there is an extremely small exposure evaluating value in exposure evaluating values sampling areas, the value is previously replaced with a fixed value, so that noises in this extremely small exposure evaluating value can be prevented from affecting exposure adjustment.

A further advantage of the present invention is that a gamma correction value is changed according to the relation between a luminance level in a priority area and a luminance area in a non-priority area, so that overexposure and underexposure in a picture can be decreased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
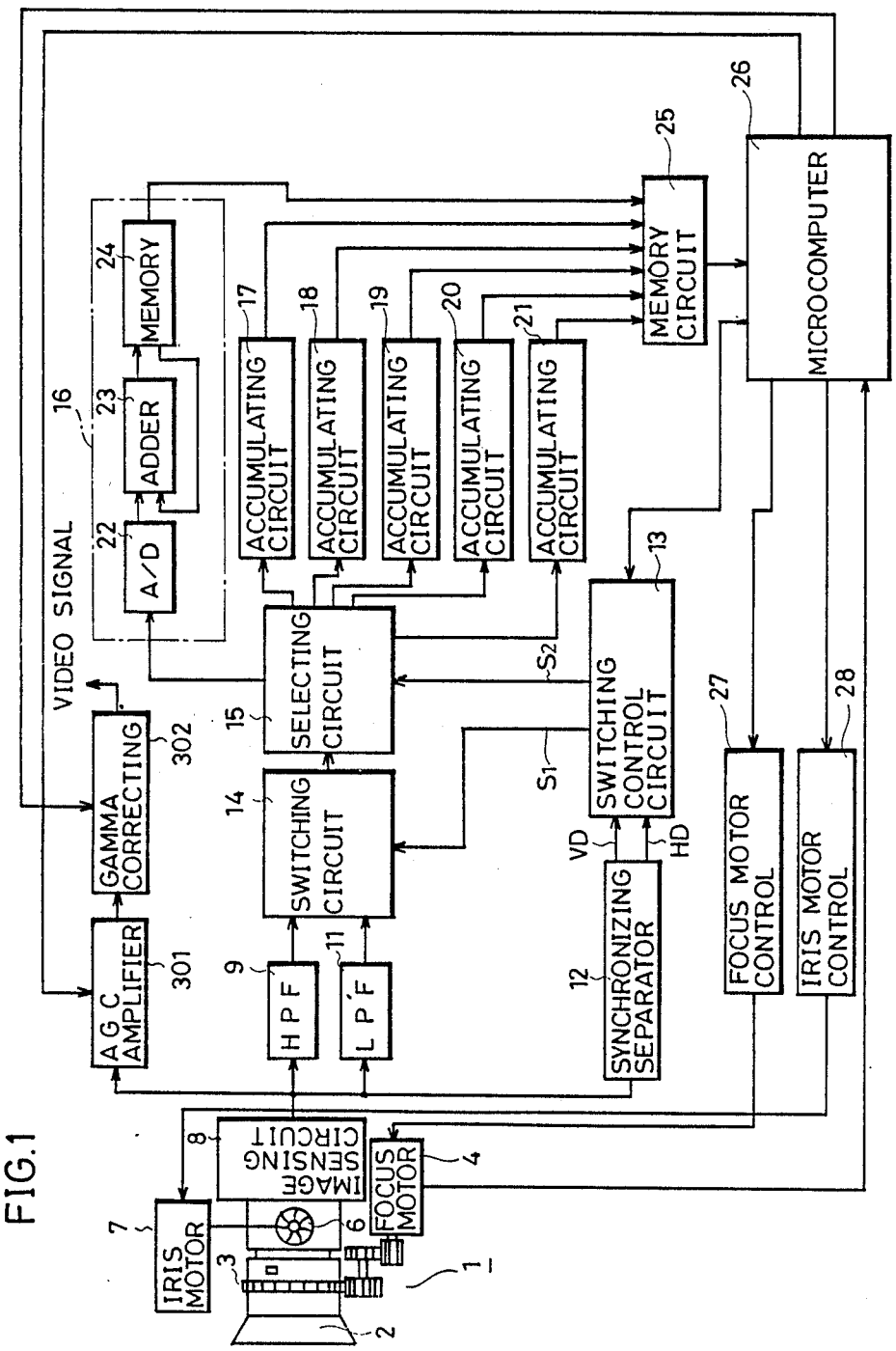
FIG. 1 is a schematic block diagram showing an automatic focusing/automatic iris apparatus according to an embodiment of the present invention.

FIG. 1 is a schematic block diagram showing an automatic focusing/automatic iris apparatus according to an embodiment of the present invention. In FIG. 1, a video camera portion 1 comprises a focusing lens 2, a focusing ring 3 for supporting this focusing lens 2 and moving the same in the direction of an optical axis, a focusing motor 4 for driving this focusing ring 3, an optical stop-down mechanism 6 for controlling exposure, an iris motor 7 for driving this stop-down mechanism 6, and an image sensing circuit 8 having a solid-state image sensor for converting light incident from an object into a video signal (referred to as image sensed video signal hereinafter).

A luminance signal in the video signal obtained from the image sensing circuit 8 is applied to a high-pass filter (HPF) 9, a low-pass filter (LPF) 11, and a synchronizing separator circuit 12.

Figure 2:
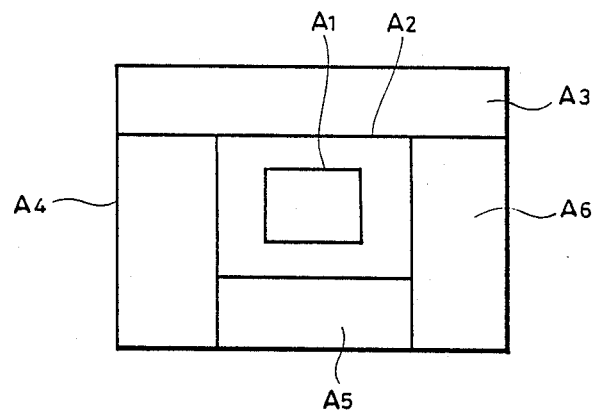
FIG. 2 is a diagram typically showing a manner in which sampling areas are set on an image sensed picture.

A vertical synchronizing signal VD and a horizontal synchronizing signal HD separated from the luminance signal by the synchronizing separator circuit 12 are supplied to a switching control circuit 13 for setting sampling areas. This switching control circuit 13 is responsive to the vertical and horizontal synchronizing signals VD and HD and a fixed output of an oscillator (not shown) serving as a clock for driving a CCD (Charge Coupled Device) for outputting a selection signal S2 to apply the same to a selecting circuit 15 in the succeeding stage so as to set a rectangular first sampling area A1 in the center of a picture, a second sampling area A2 including this sampling area A1 and having an area which is four times that of the sampling area A1, and third to sixth sampling areas A3, A4, A5 and A6 around this sampling area A2, as shown in FIG. 2. In addition, the switching control circuit 13 outputs a switching signal S1 for selecting outputs of the HPF 9 and the LPF 11 to apply the same to a switching circuit 14.

As a result, the switching circuit 14 is responsive to the switching signal S1 for selecting the output of the HPF 9 in, for example, 31 fields to continue to output the same to the selecting circuit 15 in the succeeding stage, and further selecting the output of the LPF 11 only once per 32 fields to apply the same to the selecting circuit 15.

On the other hand, the selecting circuit 15 is responsive to the selection signal S2 from the switching control circuit 13 for selectively applying an output of a filter selected by the switching circuit 14 to accumulating circuits 16, 17, ..., 21 corresponding to the respective sampling areas. More specifically, an output of each of filters with respect to the first sampling area A1 and an output of each of filters with respect to the second sampling area A2 are respectively applied to the accumulating circuits 16 and 17. Similarly, an output of each of filters with respect to the sampling areas A3, A4, A5 and A6 are respectively applied to the accumulating circuits 18, 19, 20 and 21.

The accumulating circuit 16 comprises an A/D converter 22, an adder 23, and a memory circuit 24. The A/D converter 22 sequentially A-D converts the filter output passing through the selecting circuit 15, to apply the same to the adder 23. The adder 23, together with the A/D converter 22 in the preceding stage and the memory circuit 24 in the succeeding stage, constitutes a digital integrator, which adds an output of the memory circuit 24 to an output of the A/D converter 22 to supply the result of the addition to the memory circuit 24. The memory circuit 24 is reset for each field. Thus, the memory circuit 24 holds an output of the adder 23, i.e., a value obtained by digitally converting with respect to one field, a level of a luminance signal which passed through a filter selected in the current field with respect to the first sampling area A1.

The accumulating circuits 17, 18, ..., 21 have all the same structures as that of the accumulating circuit 16. Thus, a memory circuit contained in each of the accumulating circuits holds a value obtained by integrating, with respect to one field, a level of a luminance signal which passed through a filter selected in the current field with respect to each of the sampling areas. The integrated values held in the memory circuits are further applied to a memory circuit 25 in the succeeding stage to be collectively stored therein.

The HPF 9 and the LPF 11 are respectively set to allow the passage of the band of 200 KHz to 2.4 MHz and the band of 0 to 2.4 MHz. This frequency 2.4 MHz is a substantially high frequency independent of a luminance signal and hence, the LFP 11 can be omitted. Thus, a high frequency component or a low frequency component of a luminance signal which passed through either one of the HPF 9 and the LPF 11 is digitally integrated with respect to one field, a value obtained by the integration being stored in the memory circuit 25 as an evaluating value in the current field for each sampling area. A value obtained by integrating a low frequency component in each of fields in which the LPF 11 is selected and a value obtained by integrating a high frequency component in each of fields in which the HPF 9 is selected out of integrated values stored in the memory circuit 25 are respectively operated by a microcomputer 26 in the succeeding stage as an exposure evaluating value for exposure control and a focus evaluating value for focus control.

The evaluating values are processed by the microcomputer 26 in a software manner. Based on the result of this processing, the microcomputer 26 carries out an automatic focusing operation such that the focus evaluating value reaches a maximum by issuing a command to a focusing motor control circuit 27, thereby to drive the focusing motor 4 to move the focusing lens 2. In addition, the microcomputer 26 carries out automatic exposure adjustment such that the exposure evaluating value becomes a predetermined value by also issuing a command to an iris motor control circuit 28, thereby to drive the iris motor 7 to operate the stop-down mechanism 6.

Figure 3:
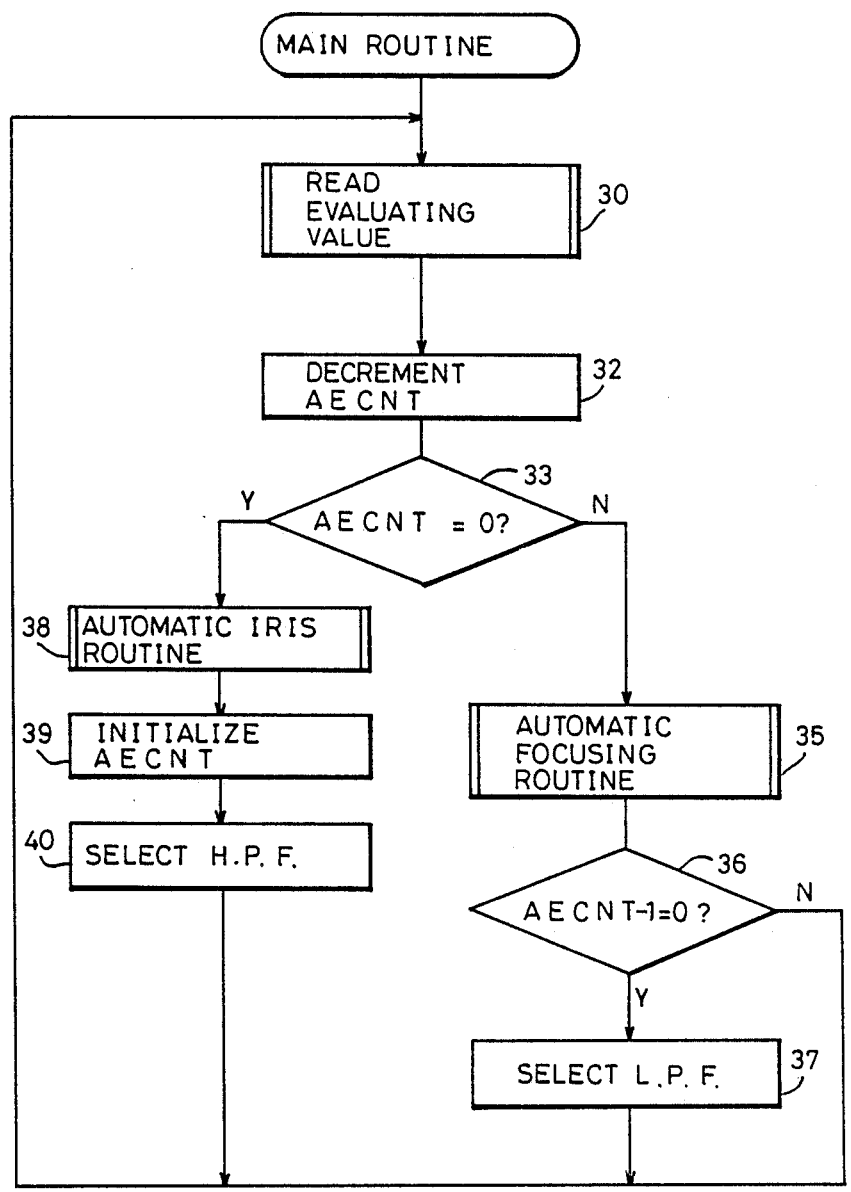
FIG. 3 is a flowchart showing a main routine in an automatic focusing/automatic iris operation.

Referring now to a flowchart of FIG. 3, description is made of a main routine in the automatic focusing operation and the automatic iris operation (automatic exposure adjustment) by the microcomputer 26.

When the video camera enters an operating state, the microcomputer 26 first executes the main routine shown in FIG. 3.

First, in the step 30, an integrated value, corresponding to the current one field, with respect to each of the sampling areas is read in the microcomputer 26 from the memory circuit 25.

Then, a count value of a counter AECNT provided for carrying out the automatic focusing operation and the automatic iris operation in a time-divisional manner is decremented, that is, one is subtracted from the count value in the step 32, to determine in the step 33 whether or not the count value is zero. The automatic focusing operation is carried out if the count value is not zero, while the automatic iris operation is carried out only when the count value is zero.

This automatic focusing operation is carried out by executing an automatic focusing routine (in the step 35) for holding the focusing lens 2 in an in-focus position based on a focus evaluating value which is an integrated value of the output of the HPF 9.

More specifically, while the automatic focusing routine is executed, integrated values DATA (1) and DATA (2) in the first and second sampling areas A1 and A2 taken when the HPF 9 is selected are extracted as focus evaluating values X (1) and X (2) in the sampling areas in the current field. First, the sampling area A1 is designated as a focusing area. With respect to the focus evaluating value X (1) in the designated first sampling area A1, the magnitude of the focus evaluating value X (1) in the current field is compared with the magnitude of the focus evaluating value X (1) in the previous field for each field, that is, every time the focus evaluating value X (1) is updated while driving the focusing motor 4 to displace the focusing lens 2 in the direction of an optical axis. The rotation of the focusing motor 4 is continued in the direction of increasing this focus evaluating value, to detect the peak of a mountain-like curve, i.e., a position where the focus evaluating value reaches the maximum value. When the focusing lens 2 reaches this position, the position is judged to be the in-focus position, to stop the focusing motor 4 to fix the position of the focusing lens 2, thereby to complete an auto-focus operation.

Furthermore, in an operation for detecting the peak of the mountain-like curve, if a distinct maximal point is not detected in the focus evaluating value X (1) in the first sampling area A1 although the position of the lens has moved from a ∞ point to a near point and the maximum value of the focus evaluating value X (2) in the second sampling area A2 is larger per unit area than that of the focus evaluating value X (1) in the first sampling area A1, the second sampling area A2 is designated as a focusing area. Thereafter, a position where the focus evaluating value X (2) reaches the maximum value is judged to be the auto-focus position to hold the focusing lens 2 in this position, thereby to complete the auto-focus operation.

Figure 12:
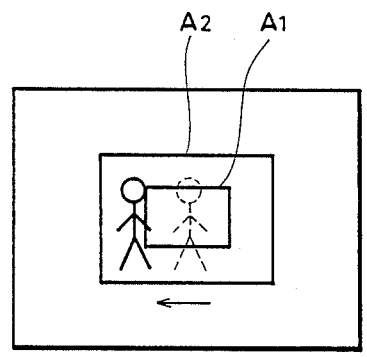
FIG. 12 is a diagram typically showing a manner in which a major object moves.

Additionally, in the automatic focusing routine, after the focusing lens 2 reaches the peak of the mountain-like curve of the focus evaluating value to hold the focusing lens 2 in this position, thereby to complete the auto-focus operation, the change of the focus evaluating value is monitored. When the focus evaluating value greatly changes, it is determined that an object moves outside of the focusing area, to start the auto-focus operation again from the beginning. In such an operation for monitoring the change of the object, if the first sampling area A1 is selected as a focusing area to complete the auto-focus operation, the monitoring operation is first carried out with respect to the first sampling area A1. If the focus evaluating value X (1) in the first sampling area A1 greatly changes, it is also determined whether or not the focus evaluating value X (2) in the second sampling area A2 changes. If the focus evaluating value X (2) changes, resumption of the auto-focus operation is instructed. However, if this focus evaluating value X (2) does not greatly change, it is determined that a major object only moves in a transverse direction from a position represented by a dash line to a position represented by a solid line, that is, moves outside of the first sampling area A1 within the second sampling area A2, as shown in FIG. 12, to change the focusing area from the first sampling area A1 to the second sampling area A2, thereby to continue the monitoring operation.

When the above described automatic focusing routine is terminated, it is determined in the step 36 whether or not the result of subtracting one from the content of the counter AECNT is zero. If the count value is zero, a control signal is generated from the microcomputer 26 to the switching control circuit 13. The switching control circuit 13 applies the switching signal S1 for selecting the output of the LPF 11 to the switching circuit 14 upon receipt of the control signal, so that the output of the LPF 11 is selected in the step 37. When the output of the LPF 11 is thus selected, the microcomputer 26 waits until an evaluating value obtained corresponding to this selected output of the LPF 11 is read in the memory circuit 25.

On the other hand, when the automatic iris operation is selected in the step 33, an automatic iris routine (in the step 38) which is the basis of the automatic iris operation is executed. Thereafter, the counter AECNT is returned to the initial state in the step 39 and the output of the HPF 9 is selected in the step 40. When the output of the HPF 9 is thus selected, the microcomputer 26 waits for accumulation of evaluating values in the next field.

The initial state of the counter AECNT is a state in which an initial value "32" is set so as to calculate an exposure evaluating value based on the luminance signal which passed through the LPF 11 by one field per 32 fields.

Figure 4:
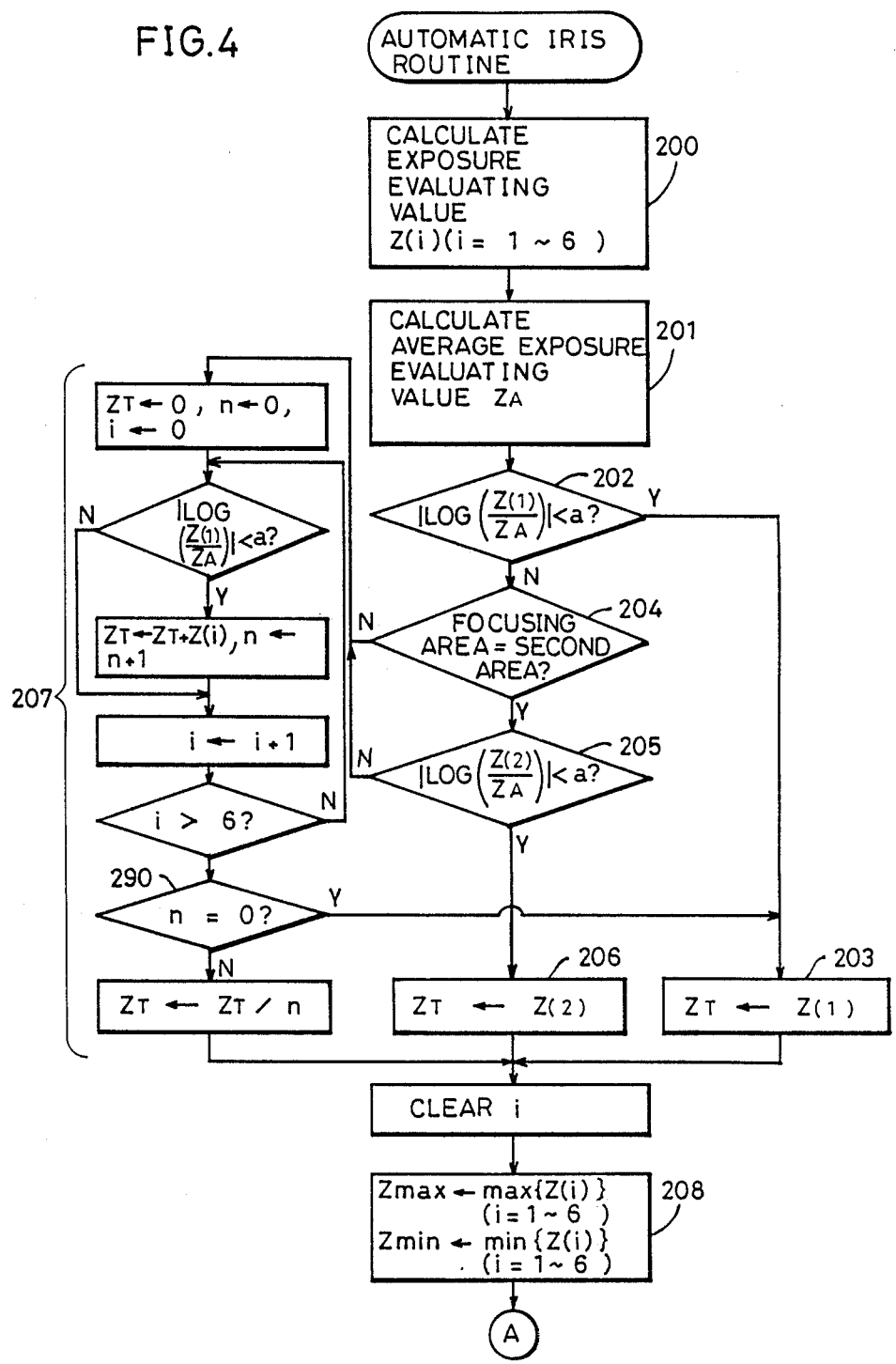
FIGS. 4 and 5 are flowcharts showing a routine in an automatic iris operation according to an embodiment of the present invention.
Figure 5:
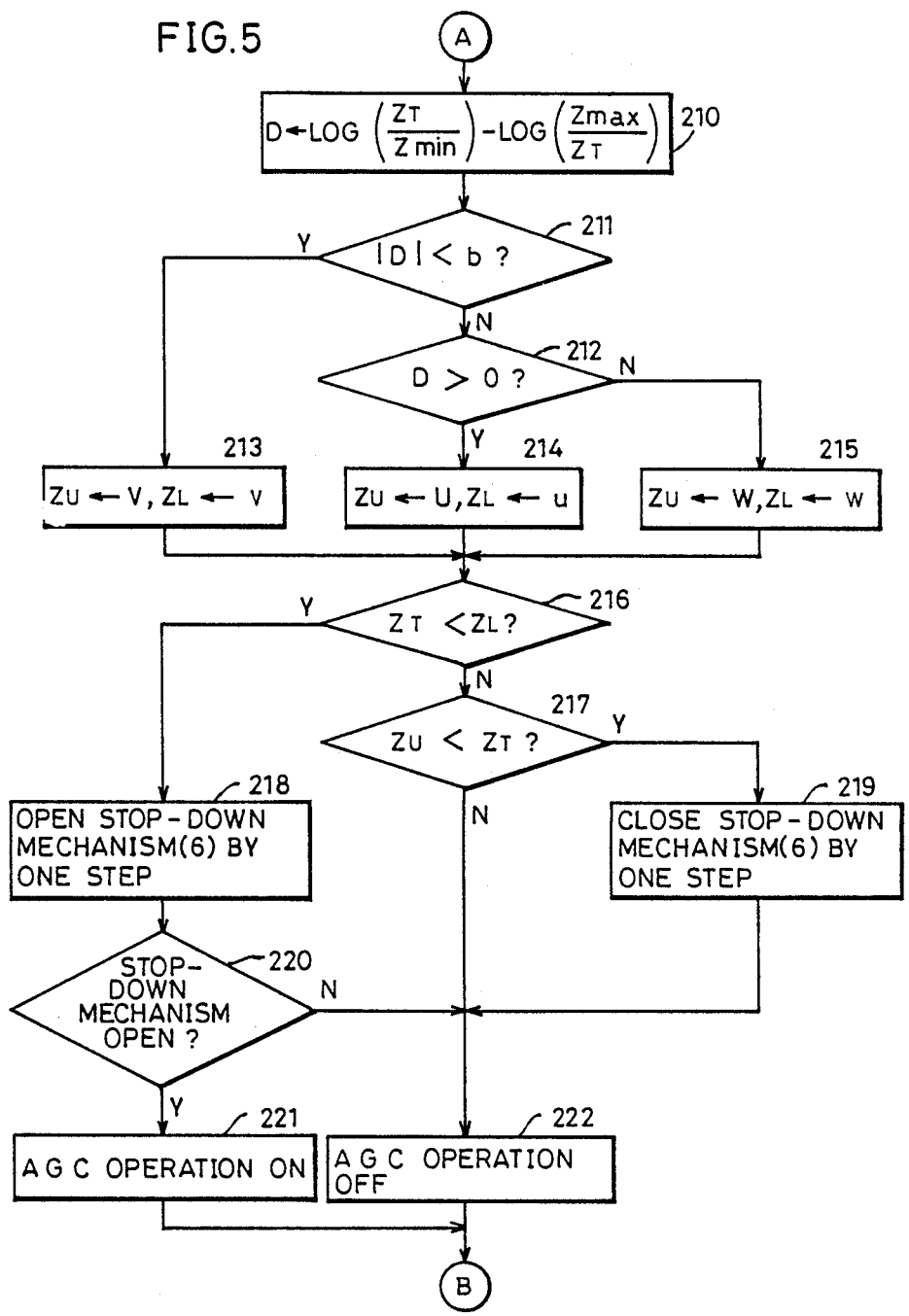

Referring now to flowcharts of FIGS. 4 and 5, description is made of the automatic iris operation according to one embodiment of the present invention.

In the step 33 in the main routine shown in FIG. 3, when it is determined that the count value of the counter AECNT becomes zero, that is, when 32 fields have elapsed since the auto-focus operation was started, an automatic iris routine shown in FIG. 4 is executed. First, values obtained by respectively normalizing integrated values DATA (1), DATA (3), ..., DATA (6), corresponding to one field, in first and third to sixth sampling areas A1, A3, A6 of the luminance signal, which passed through the LPF 11, read in the step 30 in the main routine by areas of the corresponding sampling areas, that is, integrated values per unit area obtained by dividing the integrated values DATA (1), DATA (3), ..., DATA (6) by areas SM1, SM3, ..., SM6 of the first and third to sixth sampling areas A1, A3, ..., A6 are calculated as exposure evaluating values Z (1), Z (3), ..., Z (6) corresponding to the sampling areas, in the step 200. However, since the second sampling area A2 is an area including the first sampling area A1 as described above, the exposure evaluating value Z (2) corresponding to the second sampling area A2 is also affected by the first sampling area A1 according to the above described calculating method. Therefore, an exposure evaluating value Z (2) corresponding to a sampling area excluding the first sampling area A1 from the second sampling area A2 is calculated by the following equation:

$$Z(2) = (DATA(2) - DATA(1))/(SM2 - SM1)$$

Furthermore, the average value of expos values in the entire picture given by the following expression is calculated as an average exposure evaluating value $Z_A$ in the step 201:

$$(Z(1) + Z(2) + Z(3) + Z(4) + Z(5) + Z(6))/6$$

Then, an object evaluating value $Z_T$ is determined which represent a luminance level of this picture and is the basis of exposure control.

First, the first sampling area generally designated as a focusing area in the above described automatic focusing operation is designated as a priority area for exposure control, to determine whether or not the exposure evaluating value Z (1) in the first sampling area A1 is within a predetermined allowable range with respect to the average exposure evaluating value $Z_A$. More specifically, if it is determined in the step 202 that $|LOG (Z(1)/Z_A)|$ which is the absolute value of the logarithm ratio of both the exposure evaluating values is a predetermined value a or less, this exposure evaluating value Z (1) is taken as an object evaluating value $Z_T$ in the step 203.

Furthermore, when it is determined in the step 202 that $|LOG (Z(1)/Z_A)|$ is the predetermined value a or more and it is determined in the step 204 that the second sampling area is designated as a focusing area in the above described automatic focusing operation, it is determined in the step 205 whether or not the exposure evaluating value Z (2) is within a predetermined range with respect to the average exposure evaluating value $Z_A$.

When it is determined in the step 205 that $|LOG (Z(2)/Z_A)|$ is the predetermined value a or less, this exposure evaluating value Z (2) is taken as the object evaluating value $Z_T$ in the step 206.

Additionally, when it is determined in the step 205 that $|LOG (Z(2)/Z_A)|$ a is not satisfied or it is determined in the step 204 that the second sampling area is not designated as a focusing area, the average of exposure evaluating values within a predetermined range with respect to the average exposure evaluating value $Z_A$, that is, exposure evaluating values at which $|LOG(Z(i)/Z_A)|$ is the predetermined value a or less out of exposure evaluating values Z (i) (i=1 to 6) in the sampling are is calculated as the object evaluating value $Z_T$ in the step 207. When it is determined in the step 290 that each of the exposure evaluating values corresponding to all the sampling areas is not smaller than the predetermined value a, the exposure evaluating value Z (1) in the first sampling area A1 is taken as the object evaluating value $Z_T$. In addition, in the step 208, the maximum value and the minimum value out of the exposure evaluating values Z (i) (i=1 to 6) are respectively set as values Zmax and Zmin which are required for determination of exposure.

When it is determined in the steps 202, 205 and 207 whether each of the exposure evaluating values is within an allowable range previously set with respect to the average exposure evaluating value $Z_A$ or is a value greatly different from the average exposure evaluating value $Z_A$ outside of the allowable range, the ratio of both the values may be merely used. However, in the present embodiment, the exposure evaluating value is compared with the predetermined value a after logarithm compression in consideration of the fact that dynamic range of the ratio of both values is substantially wide.

As described in the foregoing, when an object evaluating value which is an exposure evaluating value in a sampling area used in carrying out the automatic iris operation is determined out of exposure evaluating values corresponding to a plurality of sampling areas, the exposure evaluating value corresponds to the first sampling area A1 is given priority. In addition, considering a case in which an extremely high luminance portion such as light source or an extremely low luminance portion such as deep green, i.e., an abnormal luminance portion exists in this first sampling area A1 and a logarithmically compressed value of the ratio of the average evaluating value $Z_A$ and the exposure evaluating value is the predetermined value a or more, if the second sampling area A2 is designated as a focusing area, the exposure evaluating value Z (2) in this sampling area is given priority. Furthermore, when an abnormal luminance portion also exists in this second sampling area A2, the average of exposure evaluating values in sampling areas where no abnormal luminance portions exist is judged to be the object evaluating value, and the corresponding sampling areas are taken as the basis of the automatic iris operation.

Determination of the stopping-down of the lens based on the value set in the above described manner is made according to the flowchart of FIG. 5. First, in the step 210, the logarithm LOG (Zmax/$Z_T$) of the ratio of the maximum evaluating value Zmax to the object evaluating value $Z_T$ and the logarithm LOG ($Z_T$/Zmin) of the ratio of the object evaluating value $Z_T$ to the minimum evaluating value Zmin are calculated, and the difference therebetween, i.e., LOG $(Z_T/Zmin)$−LOG $(Zmax/Z_T)$ is derived as a light and darkness determining value D. This light and darkness determining value D becomes a parameter determining whether a major object for determining the object evaluating value $Z_T$ is relatively bright or dark in a picture. If the major object is bright so that the object evaluating value $Z_T$ is relatively large, the logarithm LOG $(Z_T/Zmin)$ which is the first term is increased and the logarithm LOG $(Zmax/Z_T)$ which is the second term is decreased, so that the light and darkness determining value D becomes larger. Contrary to this, if the object evaluating value $Z_T$ is relatively small, the first term is decreased and the second term is increased, so that the light and darkness determining value D becomes smaller.

Meanwhile, the reason why the logarithm of the ratio of the evaluating values is used in calculating this light and darkness determining value D is that recognition of brightness in vision of a human being is generally achieved by noting that brightness in vision is linearly changed as luminance level of an actual object is exponentially increased, for example, increased by two times, four times and eight times in that order.

When it is determined in the step 211 that $t|D|<b$ holds between the determining value D and a predetermined value b (b>0), it is determined that the luminance of the object in the picture is intermediated, to respectively set the upper limit $Z_U$ and the lower limit $Z_L$ of a target value for controlling the object evaluating valuer $Z_T$ to V and v in the step 213. In addition, when it is determined in the step 211 that $|D|<b$ does not hold and it is determined in the step 212 that the determining value D is +b or more, it is determined that the luminance of the object in the picture is relatively high, to respectively set the upper limit $Z_U$ and the lower limit $Z_L$ to U and u in the step 214. Furthermore, it is determined in the step 212 that the determining value D is −b or less, it is determined that the luminance of the object in the picture is relatively low, to respectively set the upper limit $Z_U$ and the lower limit $Z_L$ to W and w in the step 215. It is assumed in advance that the relations $U \geq V \geq W$ and $u \geq v \geq w$ respectively hold between the upper limits and between the lower limits. Accordingly, a target range, corresponding to relative brightness in the picture, of the object evaluating value $Z_T$ is set.

Meanwhile, the above described predetermined value b is a limit value taken when the luminance level of the major object is visually recognized to be significantly higher or significantly lower than the luminous level of the entire picture, which is experimentally found in advance.

Then, in the steps 216 and 217, the object evaluating value $Z_T$, the upper limit $Z_U$ and the lower limit $Z_L$ of the target value are compared. If the relation $Z_U>Z_T>Z_L$ holds, it is determined that proper exposure is obtained, to maintain the iris motor 7 for driving the optical stop-down mechanism 6 in the stopped state to maintain the present aperture of the diaphragm. On the other hand, if the object evaluating value $Z_T$ is larger than the upper limit $Z_U$, it is determined that the overexposure occurs, to drive the iris motor 7 in the direction in which the diaphragm of the stop-down mechanism 6 is closed by one step in the step 219. Contrary to this, if the object evaluating value $Z_T$ is smaller than the lower limit $Z_L$, it is determined that the underexposure occurs, to drive the iris motor 7 in the direction in which the diaphragm of the stop-down mechanism 6 is opened by one step in the step 218. The iris motor 7 is constituted by a stepping motor.

While the size of the aperture of the diaphragm is being adjusted by this iris motor 7, the gain of an AGC amplifier 301 (see FIG. 1) for amplifying an image sensed video signal is fixed to a constant value (including zero) (this state is referred to as the off state of an AGC operation) in the step 222. In addition, when it is difficult to obtain proper exposure only by adjusting the amount of incident light, that is, it is determined in the step 220 that the stop-down mechanism 6 enters the opened state while repeating the step 218 because the luminance of the object is extremely low and proper exposure is not obtained even in this state, the AGC amplifier 301 is operated in the step 221. The gain of the AGC amplifier 301 is increased or decreased such that an output thereof attains a constant level depending on whether a level of the inputted image sensed video signal is large or small (this state is referred to as the on state of the AGC operation).

Meanwhile, the opened state of the optical stop-down mechanism 6 can be detected by monitoring the amount of all rotation (the number of all steps) of the iris motor 7 and mechanically detecting an operation of the optical stop-down mechanism 6 itself.

Figure 7:
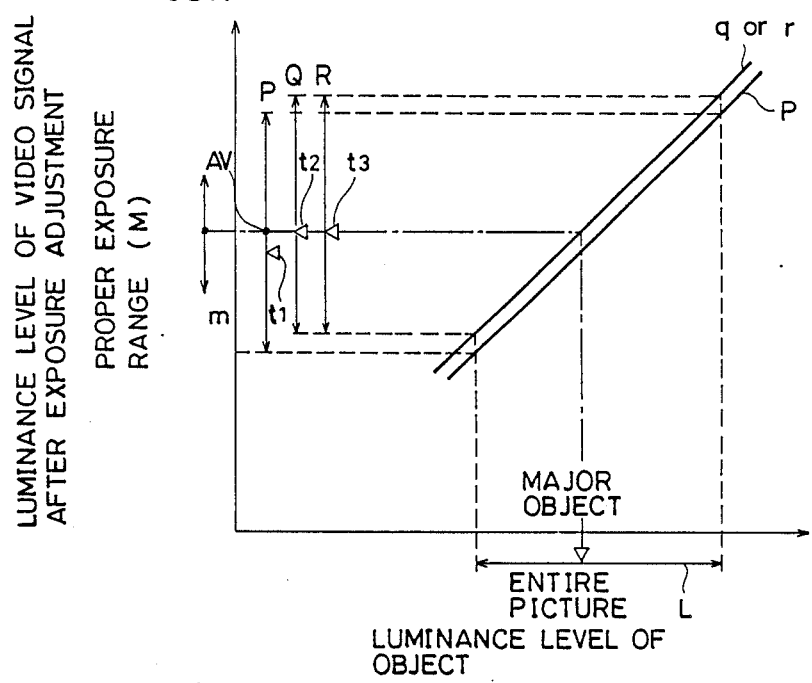
FIGS. 7, 8 and 9 are diagrams showing characteristics for explaining an exposure adjusting operation according to the present invention.
Figure 8:
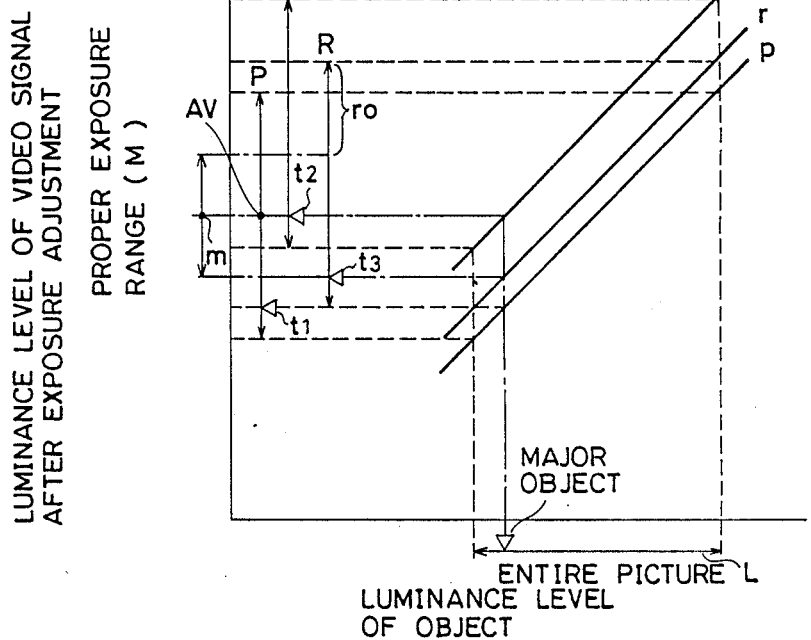
Figure 9:
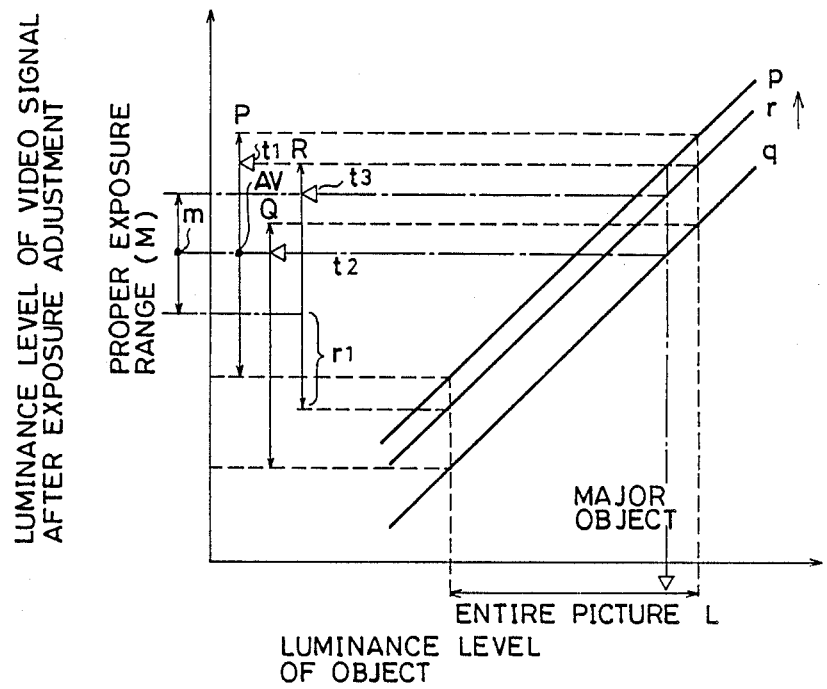

FIGS. 7 to 9 are diagrams showing characteristics of an exposure adjusting operation carried out by finely changing the upper limit and the lower limit of a target luminance level depending on whether the the light and darkness determining value D is large or small as described above. In FIGS. 7 to 9, the object evaluating value $Z_T$ is obtained from the first sampling area A1 which is a focusing area and the major object exists in this first sampling area A1, whereby the luminance level of the major object corresponds to the object evaluating value $Z_T$.

In FIGS. 7 to 9, the axis of abscissa represents an actual luminance level, before exposure adjustment, of the entire picture including the major object and the background, where a luminance region corresponding to the entire picture is represented by L (represented by an arrow in the drawings) and particularly, the actual luminance level of the major object is represented by $\nabla$. In addition, the axis of ordinate represents a luminance level of an image sensed video signal after exposure adjustment by the stop-down mechanism 6 and the AGC amplifier 301, where a proper exposure range M which is an allowable range where an image superior in quality can be recognized in vision of a human being is represented by an arrow.

FIG. 7 shows a case in which the relation $|D|<b$ holds between the light and darkness determining value D and the predetermined value b, and the actual luminance level $\nabla$ of the major object corresponding to the object evaluating value $Z_T$ is located in almost the center of the luminance region L corresponding to the entire picture, that is, the major object has relatively intermediate brightness. In addition, FIG. 8 shows a case in which the relation $D<-b$ holds, and the actual luminance level $\nabla$ of the major object is located in the slightly lower portion in the region L, that is, the major object is relatively dark. Furthermore, FIG. 9 shows a case in which the relation $D>+b$ holds, and the actual luminance level $\nabla$ of the major object is located in the slightly higher portion in the region L, that is, the major object is relatively bright.

In FIGS. 7 to 9, P represents a region of a luminance level of the image sensed video signal after exposure adjustment with respect to the entire picture in employing a conventional method of carrying out exposure adjustment based on only an average luminance level of the entire picture, the actual luminance level of the entire picture and the luminance level of the image sensed video signal in this case having a relation represented by a straight line p. An average value AV of this region P (a middle point of P) is matched with an optimum value m which is a middle point of the proper exposure range M so that the proper exposure range M can be located in the center of the region P with respect to the entire picture. However, as shown in FIGS. 8 and 9, if the actual luminance level V of the major object is in a position relatively lower or higher than the actual luminance region L corresponding to the entire picture, the luminance level of the image sensed video signal with respect to the major object is t1, which is outside of the proper exposure range M, so that overexposure or underexposure occurs with respect to the major object.

In FIGS. 7 to 9, Q represents a region of a luminance level of the image sensed video signal with respect to the entire picture in employing a conventional method of matching with the optimum value m the luminance level of the image sensed video signal with respect to the major object or a luminance level of the image sensed video signal with respect to an area including this major object, the actual luminance level of the entire picture and the luminance level of the image sensed video signal in this case having a relation represented by a straight line q. According to this method, exposure most suitable for the major object is obtained. However, in the case shown in FIGS. 8 and 9, a luminance level of another portion such as the background is greatly outside of the proper exposure range M, so that the picture includes a dim portion or a portion saturated with white.

In FIGS. 7 to 9, R represents a region of a luminance level of the image sensed video signal with respect to the entire picture obtained by the method according to the present embodiment, the actual luminance level of the entire picture and the luminance level of the image sensed video signal after exposure adjustment having a relation represented by a straight line r. According to the present embodiment, this straight line r is shifted in an up and down direction to finely change a target luminance level, as described below.

In the flowchart of FIG. 5, if the absolute value of the light and darkness determining value D is the predetermined value b or less and the major object has intermediate brightness relative to the entire picture, the upper limit and the lower limit of the target value are respectively set to V and v, to operate the stop-down mechanism 6 such that the object evaluating value $Z_T$ corresponding to the sampling area including the major object is located between the upper limit V and the lower limit v. As a result, as shown in FIG. 7, a luminance level t3 of the image sensed video signal with respect to the major object is matched with the optimum value m as in the above described region Q, and the proper exposure range M is located in almost the center of the region R of the luminance level of the image sensed video signal with respect to the entire picture, so that proper exposure adjustment is carried out.

On the other hand, when the relation $D < -b$ holds between the light and darkness determining value D and the predetermined value b and it is recognized that the luminance level of the major object is relatively low, the upper limit $Z_U$ and the lower limit $Z_L$ of the target value for controlling the object evaluating value $Z_T$ are respectively changed to W and w smaller than V and v, to operate the stop-down mechanism 6 such that the object evaluating value $Z_T$ is located between the upper limit $Z_U$ and the lower limit $Z_L$. As a result, the straight line r shown in FIG. 7 is shifted downward, so that the luminance level of the image sensed video signal with respect to the major object is located in the vicinity of the lower limit of the proper exposure range M and the region R of the luminance level of the image sensed video signal with respect to the entire picture is matched with proper exposure range M to the utmost, as shown in FIG. 8. As a result, proper exposure considerably superior in quality in vision is obtained with respect to the major object and a luminance level of another picture is not greatly outside of the proper exposure range M, so that a good picture is obtained as a whole.

Additionally, when the relation $D > +b$ holds between the light and darkness determining value D and the predetermined value b and it is recognized that the luminance level of the major object is relatively high, the upper limit $Z_U$ and the lower limit $Z_L$ of the target value for controlling the object evaluating value $Z_T$ are respectively changed to U and u larger than V and v, to operate the stop-down mechanism 6 such that the straight line r shown in FIG. 8 is shifted upward. Consequently, as shown in FIG. 9, the luminance level of the image sensed video signal with respect to the major object is located in the vicinity of the upper limit of the proper exposure range M and the region R of the luminance level of the image sensed video signal with respect to the entire picture is matched with the proper exposure range M to the utmost. As a result, proper exposure considerably superior in quality in vision is obtained with respect to the major object and a luminance level of another picture is not greatly outside of the proper exposure range M, so that a good picture is obtained as a whole.

Figure 6:
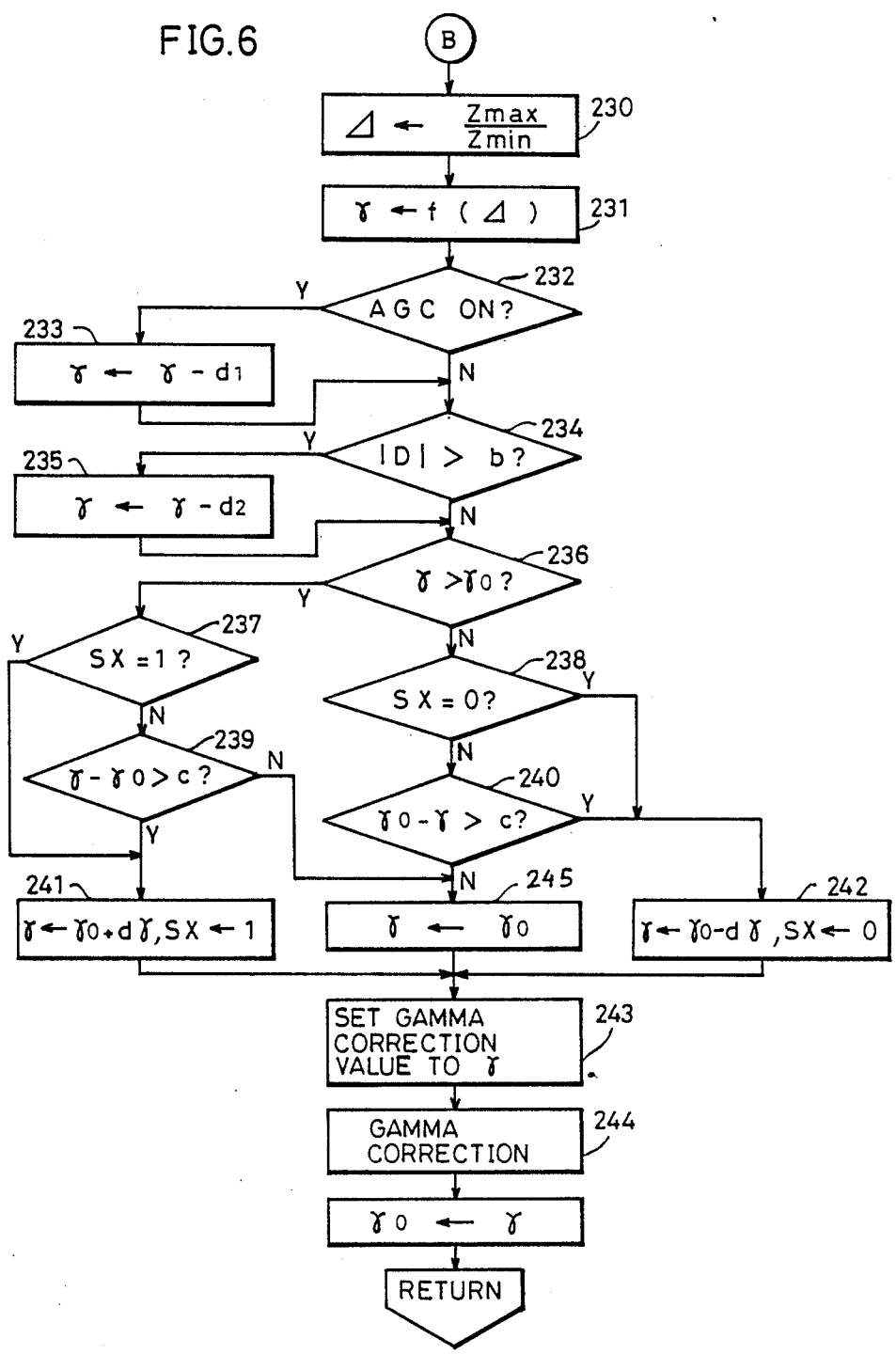
FIG. 6 is a flowchart showing a gamma correction value setting operation.

Referring now to a flowchart of FIG. 6, description is made of the determination of a gamma correction value. First, in the step 230, the contrast $\Delta$ of the picture is calculated as the ratio of the maximum value Zmax to the minimum value Zmin in the exposure evaluating values. In the step 231, the above described contrast $\Delta$ is substituted in a decreasing function $f(\Delta)$ previously set, thereby to perform an operation so as to change a gamma ($\gamma$) for correction as the most suitable value. More specifically, the gamma for correction as a target is derived in the step 231 using the following equation experimentally determined:

$$\gamma = a_0 \text{LOG}(Zmax/Zmin) + b_0$$
$$= a_0 \text{LOG}(\Delta) + b_0$$

(where $a_O$ and $b_O$ are constants, $A_O < O$, $b_O > O$)

Then, it is determined in the step 232 that the gain of the AGC amplifier 301 is not fixed to a constant value and thus, the ordinary AGC operation is enabled in the step 221 in the flowchart of FIG. 5 because the luminance of the object is extremely low, the gamma correction value $\gamma$ is decreased by a predetermined amount $d_1$ to compress the contrast of the picture in the step 233.

Consequently, a signal level of the object of low luminance is substantially raised.

Furthermore, when the relation $D < -b$ or $D > +b$ holds between the light and darkness determining value D with respect to the object evaluating value $Z_T$ (in general, the exposure evaluating value in the focusing area) and the predetermined value b in the step 234, the gamma correction value $\gamma$ is decreased by a predetermined value $d_2$ to compress the contrast of the picture in the step 235.

Figure 10:
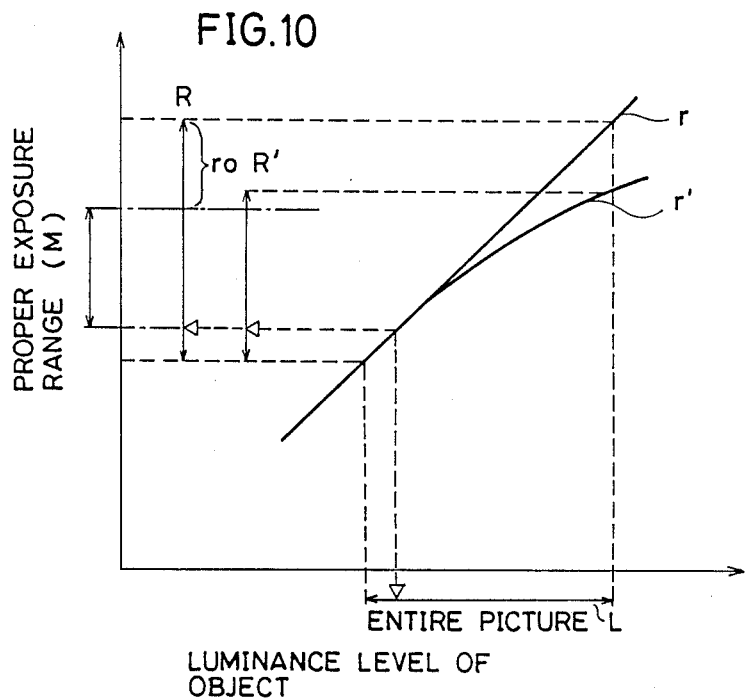
FIGS. 10 and 11 are diagrams showing characteristics for explaining a gamma correcting operation according to the present invention.

For example, when the relation $D < -b$ holds and the luminance level of the major object, i.e., the object evaluating value is relatively significantly lower then the luminance level of the entire picture, exposure adjustment is carried out by the optical stop-down mechanism 6, so that the luminance level of the major object is located in the vicinity of the lower limit of the proper exposure range M and the proper exposure range M is located in the center of the luminance region corresponding to the entire picture as represented by R shown in FIG. 8, whereby the proper exposure is obtained relative to the major object as well as the entire picture. However, a high luminance region $r_0$ in the region R after exposure adjustment remains outside of the proper exposure range M. On this occasion, if the gamma correction value $\gamma$ is decreased by the predetermined amount $d_2$ to compress the contrast the picture as described above, the, straight line r is changed to a curve r' so that the luminance region corresponding to the entire picture is changed from R to R', as shown in FIG. 10. As a result, the luminance region R' corresponding to the entire picture can be almost matched with the proper exposure range M while locating the luminance level of the major object in the vicinity of the lower limit of the proper exposure range M, to further correct exposure adjustment carried out by the optical stop-down mechanism 6 so that more proper exposure is achieved.

Figure 11:
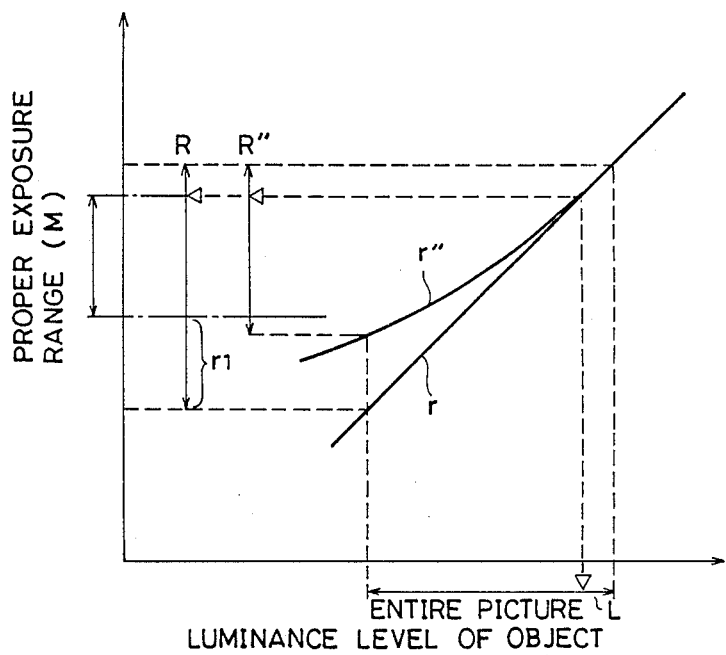

Additionally, when the relation $D > +b$ holds and the luminance level of the major object is relatively significantly higher than that of the entire picture, a low luminance region $r_1$ in the region R after exposure adjustment remains outside of the proper exposure range M, as shown in FIG. 9. On this occasion, if the gamma correction value $\gamma$ is also decreased by the predetermined amount $d_2$ to compress the contrast of the picture, the straight line r is changed to a curve r'' so that the luminance region corresponding to the entire picture changed from R to R'', as shown in FIG. 11. As a result, the luminance region R'' corresponding to the entire picture can be almost matched with the proper exposure range M while locating the luminance level of the major object in the vicinity of the upper limit of the proper exposure range M, to further correct exposure adjustment carried out by the optical stop-down mechanism 6 so that more proper exposure is achieved. Thus, overexposure in the high luminance portion and underexposure in the low luminance portion can be prevented.

Meanwhile, the luminance regions L and R and the straight lines r in FIGS. 8 and 10 are respectively the same and the luminance regions L and R and the straight lines r in FIGS. 9 and 11 are respectively the same. The gamma correction value $\gamma$ in the current field thus determined is supplied to a gamma correcting circuit 302 (see FIG. 1). If this gamma correction value $\gamma$ is greatly different from a gamma correction value $\gamma_0$ previously determined, gamma correction is made at a stroke, so that the picture is rather unclear. Therefore, the gamma correction value must be gradually changed.

In the step 236, the gamma correction value $\gamma$ in the current field and the gamma correction value $\gamma_0$ previously determined, i.e., determined 32 fields before are compared with each other. If the gamma correction value in the current field is larger, the gamma correction value is increased by the magnitude $d\gamma$ corresponding to one step in the step 241. Contrary to this, if the gamma correction value $\gamma_0$ previously determined is larger, the gamma correction value is decreased by the magnitude $d_{65}$ corresponding to one step in the step 242. In this case, the magnitude d corresponding to one step is set by dividing the difference between the maximum value and minimum value which the gamma correction value $\gamma$ can take into n (n: natural number) equal divisions. In other words, the gamma correction value $\gamma$ is changed in n steps.

In order to greatly change the gamma correction value $\gamma$ in one direction from the gamma correction value $\gamma_0$ previously determined in switching the gamma correction values, a continuous change of the gamma correction value every 32 fields is effective. However, if the gamma correction values in the current field and previously determined are close to each other, the gamma correction values fluctuate upwards and downwards by following a fine fluctuation of the luminance level due to unintentional movement of the hands, so that the switching between the gamma correction values frequently occurs, resulting in unclear picture. In order to prevent this frequent switching, the directions of the changes of the gamma correction values previously determined and in the current field are compared with each other based on the state of a flag SX in the steps 237 and 238. If both are the same, the program skips over the steps 239 and 240, to proceed to the steps 241 and 242. On the other hand, if both are different from each other, the gamma correction values are changed only when the difference $|\gamma_0 - \gamma|$ between the gamma correction values $\gamma_0$ and $\gamma$ previously determined and in the current field is a predetermined value C or more at which it is recognized that correction is indispensable, while the gamma correction value $\gamma$ is maintained at $\gamma_0$ in the step 245 when the difference $|\gamma_0 - \gamma|$ is less than the value C. As a result, the manner of change of the gamma correction value is adapted to have hysteresis.

Meanwhile, the gamma correction value $\gamma_0$ is initialized immediately after the power supply is turned on.

A control signal corresponding to the gamma correction value thus determined is inputted to the gamma correcting circuit 302 connected t the succeeding stage of the AGC amplifier 301 as a control signal. The amplification factor is changed according to an input level of an image sensed video signal based on this gamma correction value, so that the most suitable gamma correction is performed. As a result, suitable brightness is obtained over the entire picture even with respect to an object having a high picture contrast. The image sensed video signal subjected to gamma correction by the gamma correcting circuit 302 is displayed on a CRT or is recorded by a VTR (Video Tape Recorder), which are not shown.

Meanwhile, when a sampling area set on the picture is very dark, an image sensed video signal at a low level passes through an amplifier in the image sensing circuit 8, so that the S/N ratio of the image sensed video signal is degraded, whereby the error in a value of luminance level is increased. Thus, as in the above described embodiment, considering a case in which the luminance level of the image sensed video signal is A-D converted to be calculated as an exposure evaluating value $Z_i$ ($i=1$ to 6) for each sampling area, when this exposure evaluating value is extremely small, the error in the exposure evaluating value itself is increased. Thus, when an image of the same object is sensed under the same condition, the exposure evaluating value also continuously changes in a region where it is small, not to be stable. In such a state, if exposure is controlled based on the ratio of evaluating values in sampling areas as in the above described embodiment, the size of the aperture of the diaphragm of the optical stop-down mechanism 6 is frequently changed according to noises, so that the picture is liable to be very unstable.

Figure 13:
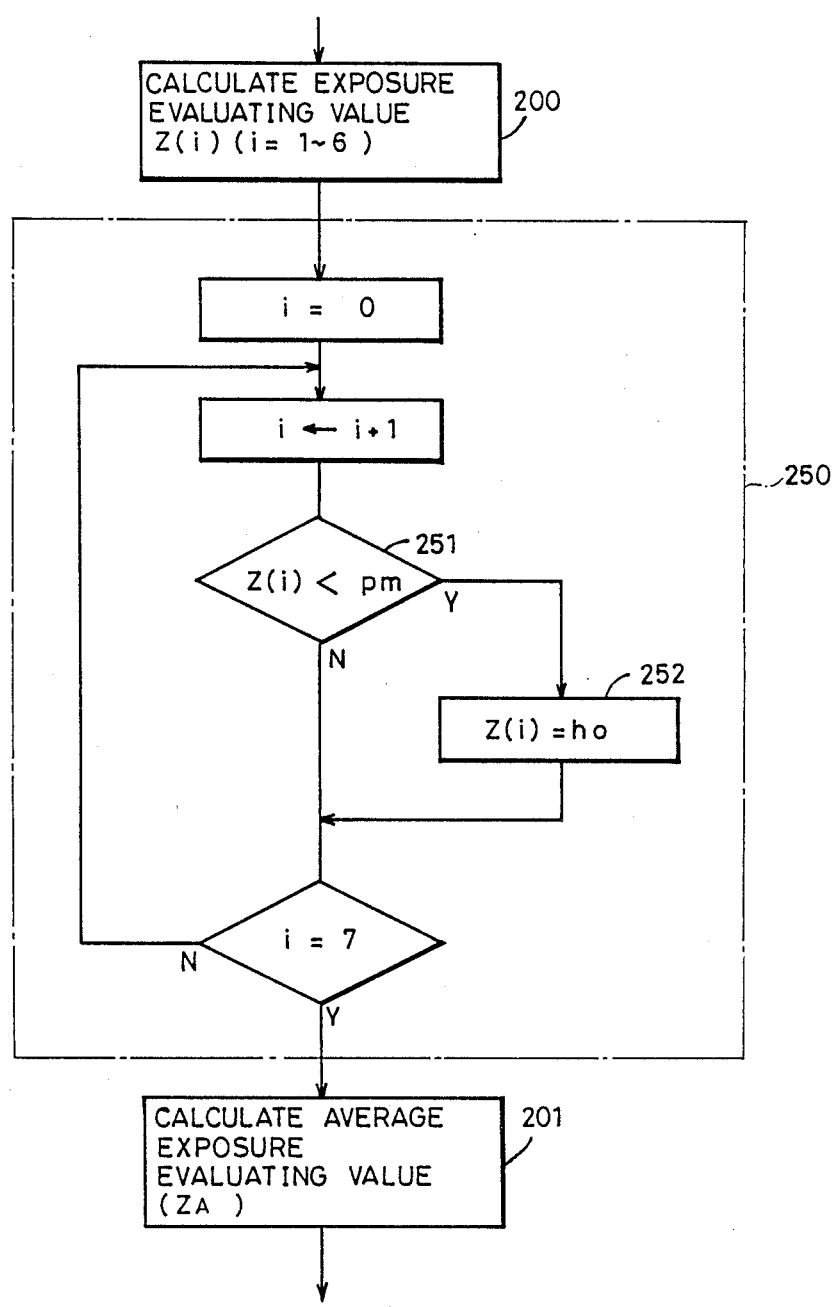
FIG. 13 is a flowchart showing an exposure evaluating value replacing routine.

Accordingly, an exposure evaluating value replacing routine 250 as in FIG. 13 is inserted between the steps 200 and 201 shown in FIG. 4. If there is an extremely small value out of exposure evaluating values Z (i) (i=1 to 6) corresponding to sampling areas, the value is previously replaced with a fixed value so that the change of this extremely small exposure evaluating value frequently caused according to noises does not affect exposure control and gamma correction.

In this exposure evaluating value replacing routine 250, an exposure evaluating value, which is judged in the step 251 to be below a limit value Pm out of the exposure evaluating values Z (i) (i=1 to 6), is replaced with a previously set fixed value $h_0$ in the step 252. Thus, after only the extremely small exposure evaluating value is replaced with the fixed value $h_0$, the step 201 and the subsequent steps in the flowchart are carried out in the above described manner, so that the change of the exposure evaluating value frequently caused by the effect of noises is prevented from affecting exposure control and gamma correction. The limit value Pm is a value at which it is recognized that the change of the exposure evaluating value caused by noises becomes significant when the luminance level is extremely small so that exposure control starts to be adversely affected, and the fixed value $h_0$ is a value below or in the vicinity of the limit value Pm, which satisfies the relation $h_0 = Pm$ or $h_0 = (\frac{1}{2})$ Pm, for example, the value being both experimentally found.

In the above described embodiment, when it is determined in the step 202 that there exists no abnormal luminance portion in the first sampling area A1, selection of the exposure evaluating value Z (1) in the first sampling area A1 as an exposure evaluating value $Z_T = Z (1)$ is given priority. In addition, when it is determined in the step 205 that there exists an abnormal luminance portion in the first sampling area A1, and the second sampling area A2 is designated as a focusing area and there exists no abnormal luminance portion in this second sampling area A2, selection of the exposure evaluating value Z (2) in a sampling area excluding the first sampling area A1 from the second sampling are A2 as an exposure evaluating value $Z_T = Z (2)$ is given priority.

However, considering a case in which in a picture having the difference in luminance between a central portion and a peripheral portion, the priority in the central portion of the picture is made higher, underexposure occurs in the peripheral portion if the central portion is brighter than the peripheral portion, while overexposure occurs in the peripheral portion if the central portion is darker than the peripheral portion. In addition, when objects move into and out of a priority area of the central portion, a luminance level in the priority area is greatly changed irrespective of the fact that the objects are identical as the entire picture, so that exposure of the entire picture becomes unstable.

Figure 14:
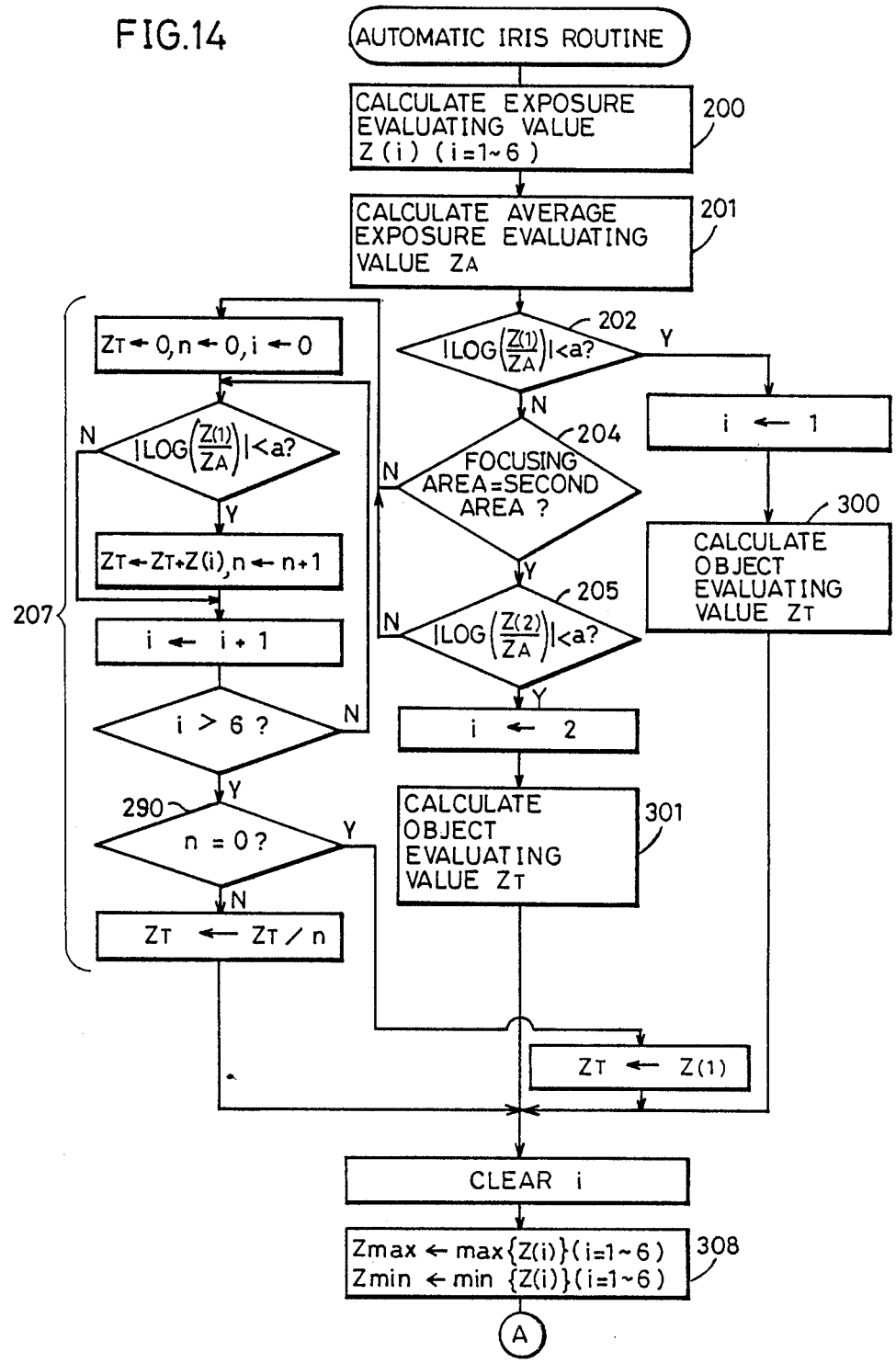
FIG. 14 is a flowchart showing a routine in an automatic iris operation according to another embodiment of the present invention.

Thus, a method of changing the priority in the central portion of the picture in the calculation of an object evaluating value which is the basis of exposure control according to the difference in luminance between the central portion and the peripheral portion of the picture is effective in the most suitable exposure control. FIG. 14 is a flowchart showing an automatic iris operation according to another embodiment carried out in consideration of this respect. In FIG. 14, the same portions as those in FIG. 4 have the same reference numerals and hence, the description thereof is not repeated. In the flowchart of FIG. 14, when the first or second sampling area A1 or A2 is designated as the priority area in the steps 202 and 205, object evaluating value calculating routine 300 or 301 obtained in consideration of the above described respect is executed.

Figure 15:
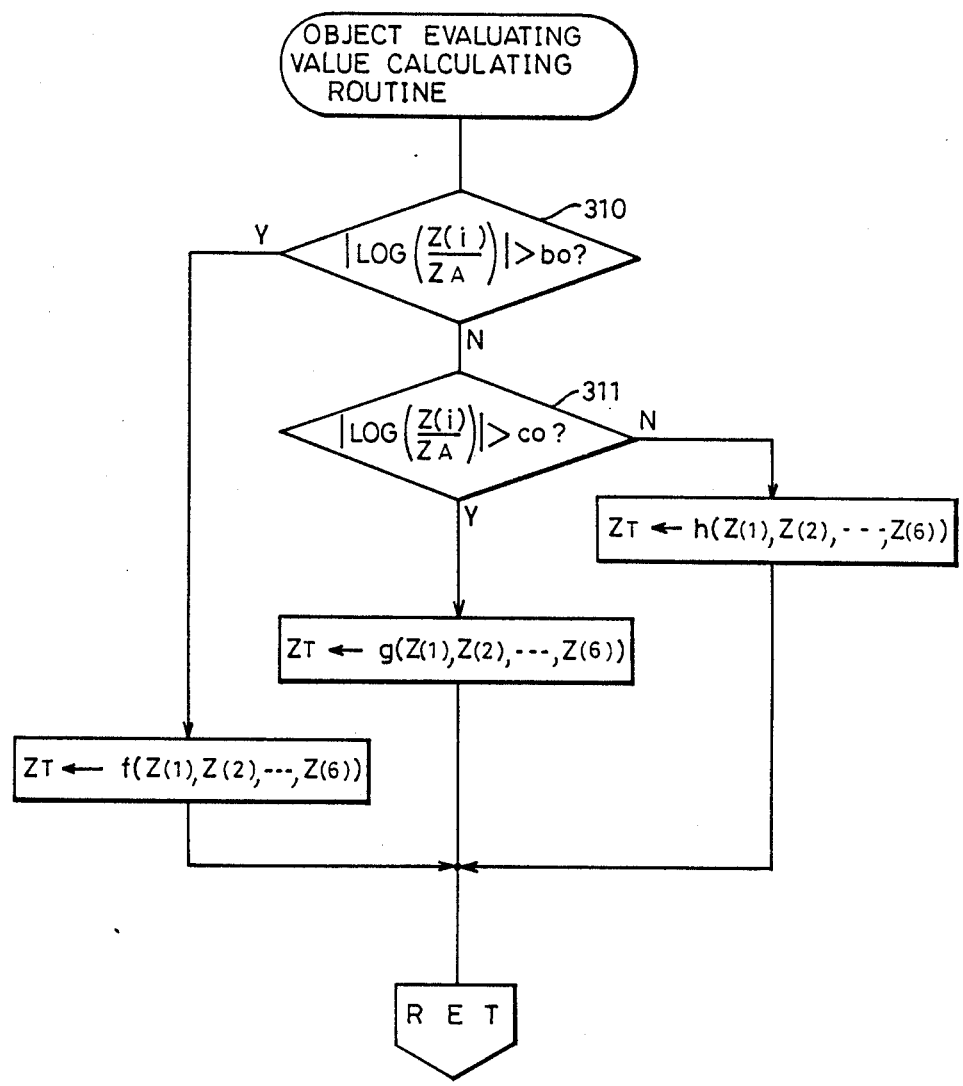
FIG. 15 is a flowchart showing an object evaluating value calculating routine in the automatic iris operation shown in FIG. 14.

As shown in FIG. 15, in these object evaluating value calculating routines 300 and 301, the relations between logarithm compression ratios $|LOG (Z (1)/Z_A)|$ and $|LOG (Z(2)/Z_A)|$ of the ratios of the exposure evaluating values Z (1) and Z (2) to the average exposure evaluating value $Z_A$ used in the steps 202 and 205 and predetermined values $b_0$ and $c_0$ are respectively determined in the steps 310 and 311. In this case, the relations $a > b_0 > c_0$ holds among the predetermined values a, $b_0$ and $c_0$.

For example, when the first sampling area A1 is designated as a priority area in the step 202 and it is determined in the step 310 that $|LOG (Z (1)/Z_A)|$ is larger than the predetermined value $b_0$, the exposure evaluating values Z (1), Z (2), ..., Z (6) corresponding to respective sampling areas are substituted in a function f to calculate the object evaluating value $Z_T$. In addition, when it is determined that $c_0 < |LOG (Z (1)/Z_A)| \leq = b_0$, the exposure evaluating values Z (1), Z (2), ..., Z (6) are substituted in a function g to calculate the object evaluating value $Z_T$. Furthermore, when it is determined that $|LOG (Z (1)/Z_A)| \leq = c_0$, the exposure evaluating value Z(1) is substituted in a function h to calculate the object evaluating value $Z_T$. In this case, $|LOG (Z(1)/Z_A)|$ has the property of being larger as the difference in luminance between sampling areas becomes larger. The object value $Z_T$ is calculated using the function f if the difference in luminance is extremely large, using the function g if the difference in luminance is slightly smaller, and using the function h if there is little difference in luminance.

The functions f, g and h are calculated as follows:

$$f(Z(1), Z(2), \ldots, Z(6)) =$$
$$(Z(1) + Z(2) + \ldots + Z(6))/6 = Z_T$$

$$g(Z(1), Z(2), \ldots, Z(6)) =$$
$$(2Z(1) + Z(2) + \ldots + Z(6))/7 = Z_T$$

$$h(Z(1), Z(2), \ldots, Z(6)) = Z(1) = Z_T$$

As obvious from the calculating methods, as the difference in luminance is larger, the effect of the exposure evaluating value Z (1) in the object evaluating value $Z_T$ can be decreased. More specifically, the priority of the first sampling area A1 which is a priority area in a calculation of the object evaluating value $Z_T$ is decreased.

Similarly, when the second sampling area A2 is designated as a priority area in the step 205, functions for calculating the object evaluating value $Z_T$ are switched to h, g and f in that order as the difference in luminance between sampling areas is larger in the calculating routine 301 of the object evaluating value $Z_T$. The calculating routine 301 is shown in almost the same flowchart as that of the routine 300. However, the exposure evaluating values Z (1) and Z (2) in the equations are replaced with each other. That is, the functions f, g and h are calculated as follows:

$$f(Z(2), Z(1), Z(3), \ldots, Z(6)) =$$
$$(Z(2) + Z(1) + Z(3) + \ldots + Z(6))/6 = Z_T$$
$$g(Z(2), Z(1), Z(3), \ldots, Z(6)) =$$
$$(2Z(2) + Z(1) + Z(3) + \ldots + Z(6))/7 = Z_T$$
$$h(Z(2), Z(1), Z(3), \ldots, Z(6)) = Z_T(2) = Z_T$$

As described in the foregoing, as the difference in luminance which is the ratio of the luminance level of the priority are to the luminance level of the entire picture is increased, a ratio with which each of the exposure evaluating values is weighted in the object evaluating value $Z_T$ is switched in steps, so that overexposure and underexposure in a non-priority area due to excessive correction can be prevented even in a picture having a large difference in a luminance. In addition, the change of the object evaluating value due to movement of the object or the like is decreased, so that an unstable change of the exposure evaluating value is reduced. As described above, exposure control is performed based on the object evaluating value calculated using an of the functions f, g and h in the step 208 and the subsequent steps in the flowchart, as in the embodiment shown in FIG. 5.

If in selecting equations for calculations in the steps 310 and 311, the equations are switched only when the conditions in the steps 310· and 311 are satisfied, for example, over continuous three fields, unstable exposure control is mitigated.

Figure 16:
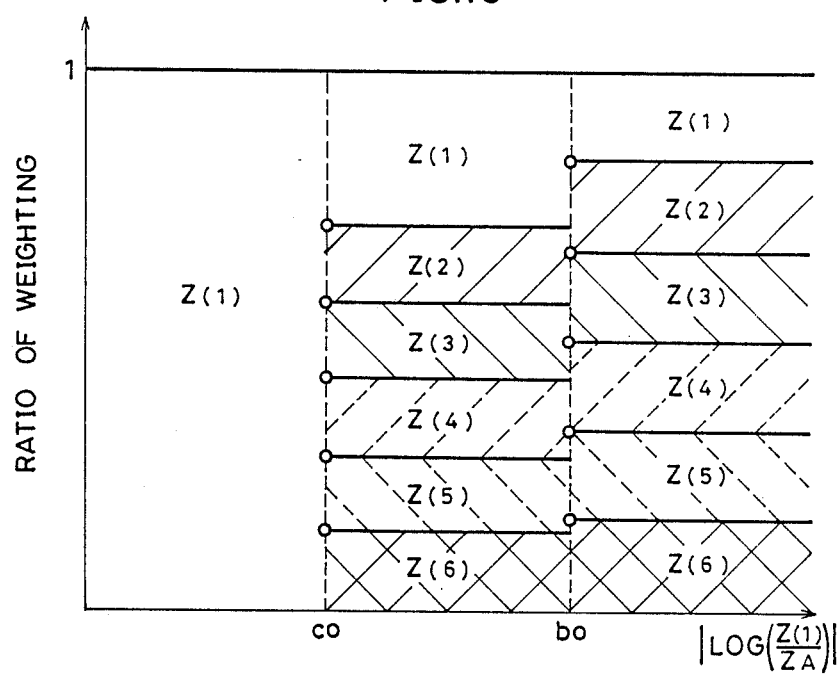
FIGS. 16 and 17 are diagrams showing the change in the ratio of weighting of exposure evaluating values in the object evaluating value calculating routine shown in FIG. 15.
Figure 17:
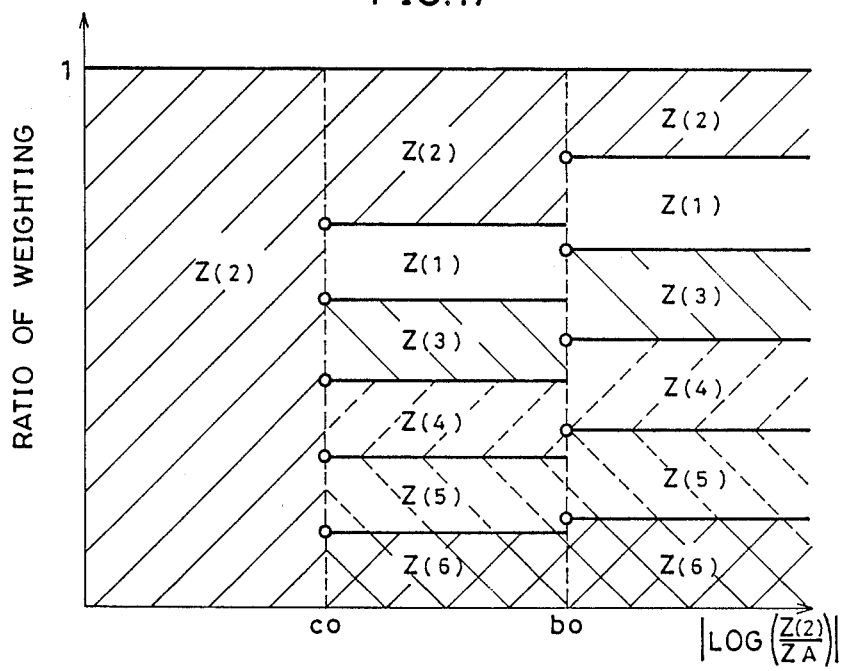

Meanwhile, in the method of calculating the object evaluating value $Z_T$ using the functions f, g and h as shown in FIGS. 14 and 15, the relation between $|LOG(Z(1)/Z_A)|$ and the ratio of weighting of each of the exposure evaluating values Z (1), Z (2),..., Z (6) in the sampling areas and the relation between $|LOG(Z(2)/Z_A)|$ and the ratio of weighting of each of the exposure evaluating values Z (1), Z (2), ..., Z (6) in sampling areas are respectively shown in FIGS. 16 and 17. More specifically, the ratio of weighting of each of the exposure evaluating values in the object evaluating value $Z_T$ is changed in steps utilizing the predetermined values $b_0$ and $c_0$ as threshold values, according to three regions among the threshold values. Thus, when $|LOG(Z(1)/Z_A)|$ or $|LOG(Z(2)/Z_A)|$ is a value in the vicinity of the predetermined values $b_0$ or $c_0$, functions to be used are frequently switched due to a slight change of a picture caused by unintentional movement of the hands and movement of an object, so that the object evaluating value $Z_T$ greatly changes. This causes the change in exposure, an unstable picture and occasionally, hunting.

Figure 18:
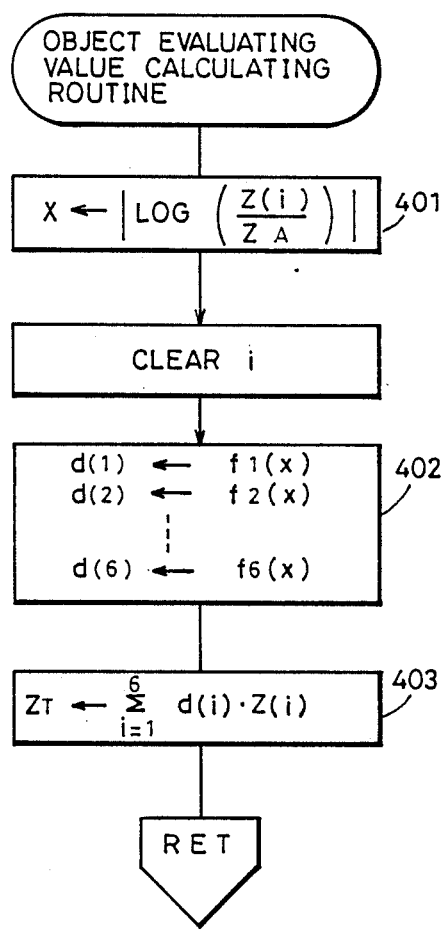
FIG. 18 is a flowchart showing another example of the object evaluating value calculating routine.

As a method for improving this respect, another embodiment is effective in which a routine shown in FIG. 18 is executed instead of the object evaluating value calculating routine shown in FIG. 15. For example, when the first sampling area A1 is designated as a priority area in the step 202 and the object evaluating value $Z_T$ is calculated in the step 300, the calculating routine shown in FIG. 18 is executed. First, $|LOG(Z(1)/Z_A)|$ is taken as a variable (x) in the step 401, and this variable (x) is respectively substituted in six continuous weighting functions fi (x) (i=1, 2, ... ,6) to determine the ratio of weighting of each of the exposure evaluating values Z (i) in the step 402. The relation $$\sum_{i=1}^{6} f_i(x) = 1$$

Figure 19:
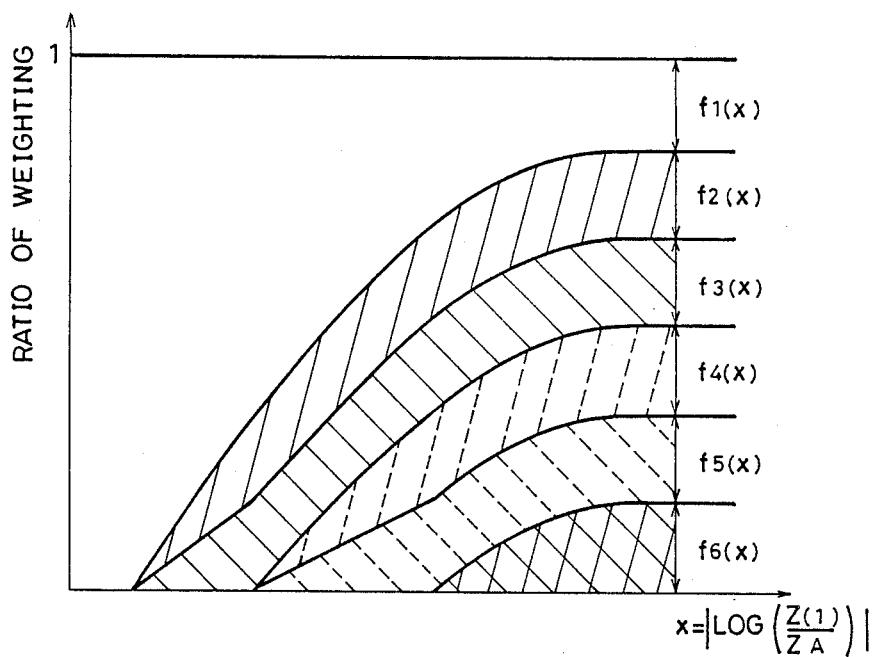
FIGS. 19 and 20 are digrams showing the change in the ratio of weighting of exposure evaluating values in the object evaluating value calculating routine shown in FIG. 18.

(where x=0 to ∞) always holds among the six functions, each of which is changed not in steps as shown in FIG. 16 but like a smooth curve according to the variable (x) as shown in FIG. 19. More specifically, the variable (x) is substituted in the functions fi (x) to calculate the ratio d (i) (i=1 to 6) of weighting of each of the exposure evaluating values in sampling areas in the step 402, and each of the exposure evaluating values Z (i) is averaged by weighting according to the ratio d (i) (i=1 to 6) for each sampling area based on the following equation to calculate the object evaluating value $Z_T$ in the step 403:

$$Z_T = \sum_{i=1}^{6} d(i) Z(i)$$

Figure 20:
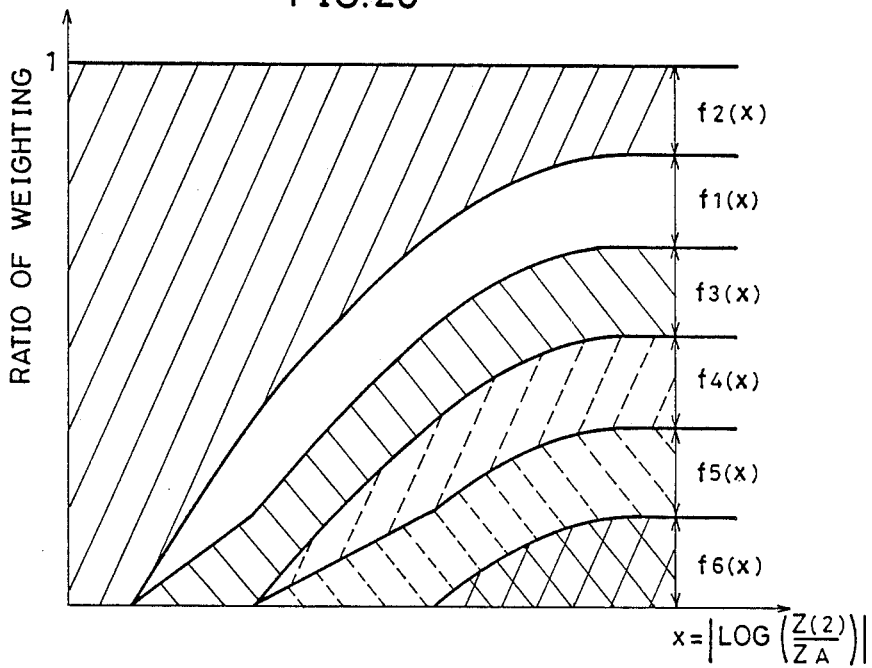

Similarly, when the second sampling area A2 is designated as a priority area in the step 205, $|LOG(Z(2)/Z_A)|$ is taken as a variable (x) instead of $|LOG(Z(1)/Z_A)|$ as described in FIG. 18 and the functions $f_1(x)$ and $f_2(X)$ shown in FIG. 19 are further replaced with each other as shown in FIG. 20 in the object evaluating value calculating routine 301, so that the object evaluating value $Z_T$ is calculated in the routine shown in FIG. 18.

Thus, since the function fi (x) is continuously changed according to the variable (x), the change of the object evaluating value $Z_T$ can be made smoother according to the change of the picture, so that the picture can be stable.

As described in the foregoing, according to the embodiment of the present invention, a target luminance level for exposure adjustment is changed, a ratio with which an exposure evaluating value corresponding to a priority area is weighted is changed, or a gamma correction value is changed according to the relation between luminance levels in the priority area and a non-priority area, so that overexposure and underexposure in a picture can be decreased. In addition, if there is an extremely small value in exposure evaluating value corresponding to sampling areas, the value is previously replaced with a fixed value, so that exposure control can be prevented from being affected by noises or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus for automatically adjusting exposure to an object, comprising
    image sensing means (2, 8) having a lens and an image sensor for generating a video signal in response to light incident from said object,
    means (6, 7, 301) for changing exposure to said object,
    means (12, 13, 15) for setting a plurality of sampling areas divided on an image sensed picture in a time-divisional manner of said video signal,
    exposure evaluating value detecting means (11, 16-21) for detecting a level of a luminance signal in a video signal in each of said plurality of sampling areas, to supply the same as an exposure evaluating value in the corresponding sampling area,
    object evaluating value calculating means (26) for selecting at least one of said plurality of sampling areas as a priority area for exposure control and calculating an object evaluating value representing exposure of the entire image sensed picture based on an exposure evaluating value in the selected sampling area,
    exposure control means (26, 28) for controlling said exposure changing means such that said object evaluating value approaches a target luminance level, and
    means (26) for changing said target luminance level according to the relation between said object evaluating value and exposure evaluating values in sampling areas other than the sampling area selected as said priority area.

2. The image sensing apparatus according to claim 1, wherein said means for changing the target luminance level comprises
    means for increasing said target luminance level when said object evaluating value is larger than the exposure evaluating values in the other sampling areas while decreasing said target luminance level when said object evaluating value is smaller than the exposure evaluating values in the other sampling areas 3. The image sensing apparatus according to claim 1, wherein said object evaluating value calculating means comprises
    means for determining based on said exposure evaluating value in each of said plurality of sampling areas whether or not an abnormal luminance portion exists in the corresponding area, and
    means for preventing a sampling area where said abnormal luminance portion exists from being selected as said priority area.

4. The image sensing apparatus according to claim 1, wherein said plurality of sampling areas at least comprise a first sampling area located in the center of the image sensed picture and a second sampling area including said first sampling area and having a larger area than that of said first sampling area.

5. The image sensing apparatus according to claim 4, wherein said object evaluating value calculating means comprises
    mean for supplying an exposure evaluating value in said first sampling area as an object evaluating value if no abnormal luminance portion exists in said first sampling area,
    means for supplying an exposure evaluating value in said second sampling area as an object evaluating value if an abnormal luminance portion exists in said first sampling area and no abnormal luminance portion exists in said second sampling area, and
    means for supplying as an object evaluating value the average of the exposure evaluating values in the other sampling areas where no abnormal luminance portions exist, when abnormal luminance portions exist in said first and second sampling areas.

6. The image sensing apparatus according to claim 5, wherein said object evaluating value calculating means comprises
    means for supplying the exposure evaluating value in said first sampling area as an object evaluating value when abnormal luminance portions exist in all of said plurality of sampling areas.

7. The image sensing apparatus according to claim 1, wherein said target luminance level has a range defined by the upper limit and the lower limit, and
    said means for changing the target luminance level comprises means for changing the upper limit and the lower limit of said target luminance level according to the relation between the maximum value and the minimum value out of said exposure evaluating values and said object evaluating value.

8. The image sensing apparatus for automatically adjusting exposure to an object, comprising:
    image sensing means (2, 8) having a lens and an image sensor for generating a video signal in response to light incident from said object,
    means (6, 7, 301) for changing exposure to said object,
    means (12, 13, 15) for setting a plurality of sampling areas divided on an image sensed picture in a time-divisional manner of said video signal,
    exposure evaluating value detecting means (11, 16-21) for detecting a level of a luminance signal in a video signal in each of said plurality of sampling areas, to supply the same as an exposure evaluating value in the corresponding sampling area,
    object evaluating value calculating means (26) for selecting at least one of said plurality of sampling areas as a priority area for exposure control, weighting with a predetermined ratio an exposure evaluating value in the selected sampling area with respect to exposure evaluating values in sampling areas other than the sampling area selected as said priority area and calculating an object evaluating value representing exposure of the entire image sensed picture based on the exposure evaluating values,
    exposure control means (26, 28) for controlling said exposure changing means such that said object evaluating value approaches a predetermined target luminance level, and
    means (26) for changing said ratio according to the relation between said object evaluating value and the exposure evaluating values in the other sampling areas.

9. The image sensing apparatus according to claim 8, wherein said object evaluating value calculating means comprises
    means for determining based on said exposure evaluating value in each of said plurality of sampling areas whether or not an abnormal luminance portion exists in the corresponding sampling area, and
    means for preventing a sampling area where said abnormal luminance portion exists from being selected as said priority area.

10. The image sensing apparatus according to claim 8, wherein said plurality of sampling areas comprise at least a first sampling area located in the center of the image sensed picture and a second sampling area including said first sampling area and having a larger area than that of said first sampling area.

11. The image sensing apparatus according to claim 8, wherein said means for changing the ratio comprises
means for changing said ratio in steps according to the relation between the exposure evaluating value in the sampling area selected as said priority area and the average of the exposure evaluating values in all the sampling areas.

12. The image sensing apparatus according to claim 8, wherein said means for changing the ratio comprises
means for continuously changing said ratio according to the relation between the exposure evaluating value in the sampling area selected as said priority area and the average of the exposure evaluating values in all the sampling areas.

13. The image sensing apparatus according to claim 8, which further comprises means for changing said target luminance level according to the relation between said object evaluating value and the exposure evaluating values in the other sampling areas.

14. The image sensing apparatus for automatically adjusting exposure to an object, comprising:
image sensing means (2, 8) having a lens and an image sensor for generating a video signal in response to light incident from said object,
means (6, 7, 301) for changing exposure to said object,
means (12, 13, 15) for setting a plurality of sampling areas divided on an image sensed picture in a time-divisional manner of said video signal,
exposure evaluating value detecting means (11, 16-21) for detecting a level of a luminance signal in a video signal in each of said plurality of sampling areas, to supply the same as an exposure evaluating value in the corresponding sampling area,
means (26) for comparing the exposure evaluating value supplied from said exposure evaluating value calculating means with a predetermined reference value, to replace the exposure evaluating value with a predetermined fixed value when said exposure evaluating value is smaller than said reference value,
object evaluating value calculating means (26) for selecting at least one of said plurality of sampling areas as a priority area for exposure control and calculating an object evaluating value representing exposure of the entire image sensed picture based on an exposure evaluating value in the selected sampling area, and
exposure control means (26, 28) for controlling said exposure changing means such that said object evaluating value approaches a predetermined target luminance level.

15. The image sensing apparatus according to claim 14, which further comprises
means for changing said target luminance level according to the relation between said object evaluating value and exposure evaluating values in sampling areas other than the sampling area selected as said priority area.

16. The image sensing apparatus according to claim 14, wherein said object evaluating value calculating means comprises
means for determining based on said exposure evaluating value in each of said plurality of sampling areas whether or not an abnormal luminance portion exists in the corresponding sampling area, and
means for preventing a sampling area where said abnormal luminance portion exists from being selected as said priority area.

17. The image sensing apparatus according to claim 14, wherein said plurality of sampling areas comprise at least a first sampling area located in the center of the image sensed picture and a second sampling area including said first sampling area and having a larger area than that of said first sampling area.

18. The image sensing apparatus according to claim 14, wherein said fixed value is determined based on a value at which the effect of the change of the exposure evaluating value caused by noises on exposure control can be recognized.

19. The image sensing apparatus according to claim 14, which further comprises
means for calculating a value indicating the contrast of the image sensed picture based on the exposure evaluating value supplied from said exposure evaluating value detecting means, and
means for determining a gamma correction value based on said value indicating the contrast to perform gamma correction of said video signal according to the gamma correction value.

20. An image sensing apparatus for automatically adjusting exposure to an object and automatically performing gamma correction of a video signal, comprising:
image sensing means (2, 8) having a lens and an image sensor for generating a video signal in response to light incident from said object,
means (6, 7, 301) for changing exposure to said object,
means (12, 13, 15) for setting a plurality of sampling areas divided on an image sensed picture in a time-divisional manner of said video signal,
exposure evaluating value detecting means (11, 16-21) for detecting a level of a luminance signal in a video signal in each of said plurality of sampling areas, to supply the same as an exposure evaluating value in the corresponding sampling area,
object evaluating value calculating means (26) for selecting at least one of said plurality of sampling areas as a priority area for exposure control and calculating an object evaluating value representing exposure of the entire image sensed picture based on an exposure evaluating value in the selected sampling area,
exposure control means (26, 28) for controlling said exposure changing means such that said object evaluating value approaches a predetermined target luminance level,
means (26) for calculating a value indicating the contrast of the image sensed picture based on the exposure evaluating values supplied from said exposure evaluating value detecting means,
means (26) for determining a gamma correction value based on said value indicating the contrast to perform gamma correction of said video signal according to the gamma correction value, and
means (26) for changing said gamma correction value according to the relation between said object evaluating value and exposure evaluating values in the sampling areas other than the sampling area selected as said priority area.

21. The image sensing apparatus according to claim 20, wherein said object evaluating value calculating means comprises means for determining based on said exposure evaluating value in each of said plurality of sampling areas whether or not an abnormal luminance portion exists in the corresponding sampling area, and means for preventing a sampling area where said abnormal luminance portion exists from being selected as said priority area.

22. The image sensing apparatus according to claim 20, wherein said plurality of sampling areas comprise at least a first sampling area located in the center of the image sensed picture and a second sampling area including said first sampling area and having a larger area than that of said first sampling area.

23. The image sensing apparatus according to claim 20, wherein said means for calculating the value indicating the contrast comprises means for supplying the ratio of the maximum value and the minimum value out of said exposure evaluating values as said value indicating the contrast.

24. The image sensing apparatus according to claim 23, wherein said means for performing gamma correction comprises means for determining a gamma correction value γ based on a value Δ indicating said contrast by the following equation:

γ=a₀LOGΔ+b₀(a₀, b₀: negative constant, positive constant)

25. The image sensing apparatus according to claim 20, wherein said means for changing the gamma correction value comprises means for increasing or decreasing said gamma correction value in steps according to the relation between said object evaluating value and the exposure evaluating values in the other sampling areas.

26. The image sensing apparatus according claim 25, wherein said means for changing the gamma correction value comprises means for allowing the change of said gamma correction value only when the difference between the newest gamma correction value and the previous gamma correction value exceeds the predetermined value, when the newest direction to increase or decrease said gamma correction value is different from the previous direction.

27. An image sensing apparatus for automatically adjusting exposure to an object and automatically performing gamma correction of a video signal, comprising:

image sensing means (2, 8) having a lens and an image sensor for generating a video signal in response to light incident from said object, means (6, 7, 301) for changing exposure to said object, means (12, 13, 15) for setting a plurality of sampling areas divided on an image sensed picture in a time-divisional manner of said video signal, exposure evaluating value detecting means (11, 16–21) for detecting a level of a luminance signal in a video signal in each of said plurality of sampling areas, to supply the same as an exposure evaluating value in the corresponding sampling area, object evaluating value calculating means (26) for selecting at least one of said plurality of sampling areas as a priority area for exposure control and calculating an object evaluating value representing exposure of the entire image sensed picture based on an exposure evaluating value in the selected sampling area, exposure control means (26, 28) for controlling said exposure changing means such that said object evaluating value approaches a predetermined target luminance level, means (26) for calculating a value indicating the contrast of the image sensed picture based on the exposure evaluating values supplied from said exposure evaluating value detecting means, and means (26) for determining a gamma correction value based on said value indicating the contrast to perform gamma correction of said video signal according to the gamma correction value.

28. An image sensing apparatus for automatically adjusting exposure to an object and automatically performing gamma correction of a video signal, comprising:

image sensing means (2, 8) having a lens and an image sensor for generating a video signal in response to light incident from said object, means (6, 7, 301) for changing exposure to said object, means (12, 13, 15) for setting a plurality of sampling areas divided on an image sensed picture in a time-divisional manner of said video signal, exposure evaluating value detecting means (11, 16-21) for detecting a level of a luminance signal in a video signal in each of said plurality of sampling areas, to supply the same as an exposure evaluating value in the corresponding sampling area, object evaluating value calculating means (26) for selecting at least on of said plurality of sampling areas as a priority area for exposure control and calculating an object evaluating value representing exposure of the entire image sensed picture based on an exposure evaluating value in the selected sampling area, exposure control means (26, 28) for controlling said exposure changing means such that said object evaluating value approaches a predetermined target luminance level, means (26) for determining a gamma correction value to perform gamma correction of said video signal according to the gamma correction value, and means (26) for changing said gamma correction value according to the relation between said object evaluating value and exposure evaluating values in the sampling areas other than the sampling area selected as said priority area.

* * * * *